United States Patent
Chui

(10) Patent No.: US 7,174,020 B2
(45) Date of Patent: Feb. 6, 2007

(54) SYSTEM AND METHOD FOR REAL-TIME SECURE COMMUNICATION BASED ON MULTI-LEVEL TRANSFORM AND ENCRYPTION

(75) Inventor: Charles K. Chui, Menlo Park, CA (US)

(73) Assignee: Telesecura Corporation, Menlo Park, CA (US)

( * ) Notice: Subject to any disclaimer, the term of this patent is extended or adjusted under 35 U.S.C. 154(b) by 968 days.

(21) Appl. No.: 10/278,162

(22) Filed: Oct. 21, 2002

(65) Prior Publication Data

US 2003/0091184 A1 May 15, 2003

Related U.S. Application Data

(60) Provisional application No. 60/344,842, filed on Oct. 22, 2001.

(51) Int. Cl.
*H04K 1/04* (2006.01)

(52) U.S. Cl. .................................................. 380/269

(58) Field of Classification Search ................. 380/269, 380/217, 216
See application file for complete search history.

(56) References Cited

U.S. PATENT DOCUMENTS

| | | | | |
|---|---|---|---|---|
| 5,788,648 | A | 8/1998 | Nadel | 600/544 |
| 5,809,139 | A * | 9/1998 | Girod et al. | 380/202 |
| 5,909,518 | A * | 6/1999 | Chui | 382/277 |
| 6,185,312 | B1 * | 2/2001 | Nakamura et al. | 382/100 |
| 6,415,042 | B1 | 7/2002 | Shin | 382/100 |
| 6,834,344 | B1 * | 12/2004 | Aggarwal et al. | 713/176 |
| 6,985,585 | B2 * | 1/2006 | Keyes et al. | 380/201 |
| 2002/0188570 | A1 | 12/2002 | Holliman et al. | |

FOREIGN PATENT DOCUMENTS

| | | |
|---|---|---|
| EP | 1 033 880 A2 | 9/2000 |
| EP | 1033880 A2 * | 9/2000 |

OTHER PUBLICATIONS

A. Hauter et al., *Compression and Encryption*, CS1 801 Project Fall 1995, http://www.science.gmu.edu/~mchacko/csi801/proj-ckv.html, entire document, Dec. 7, 1995.
Amara Graps, *An Introduction to Wavelets*, 1995 Institute of Electrical and Electronics Engineers, Inc.
John Przybylski, *Wavelets and Cryptography*, Masters Project, Marymount University, Dec. 16, 1998.

* cited by examiner

*Primary Examiner*—Gilberto Barron
(74) *Attorney, Agent, or Firm*—Morgan, Lewis & Bockius LLP

(57) ABSTRACT

A stream of data is encoded by applying a multilevel transform to the stream of data, each level of the transform producing one or more transform coefficients for each block of a sequence of blocks in the stream of data. Encryption is applied to at least a subset of the transform coefficients produced by a least one level of the multilevel transform. Furthermore, at least one level of the multilevel transform is applied to the encrypted transform coefficients. The multi-level transform and encryption operations generate a result set of transform coefficients. The result set of transform coefficients may be encrypted, using a symmetric key encryption, to generate an output data stream that is then transmitted from a sending device to a receiving device. The encoding method may be performed in real time, producing the output data stream at a same rate as the stream of data is presented for encoding.

22 Claims, 26 Drawing Sheets

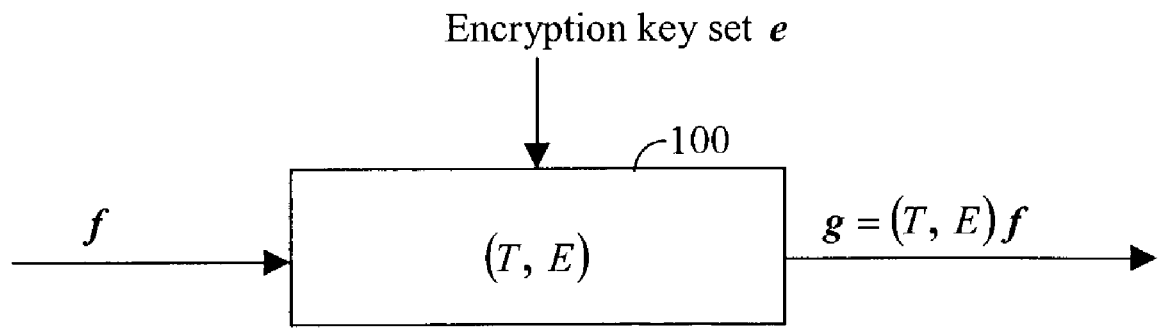
FIG. 1A (Transform-encryption system)
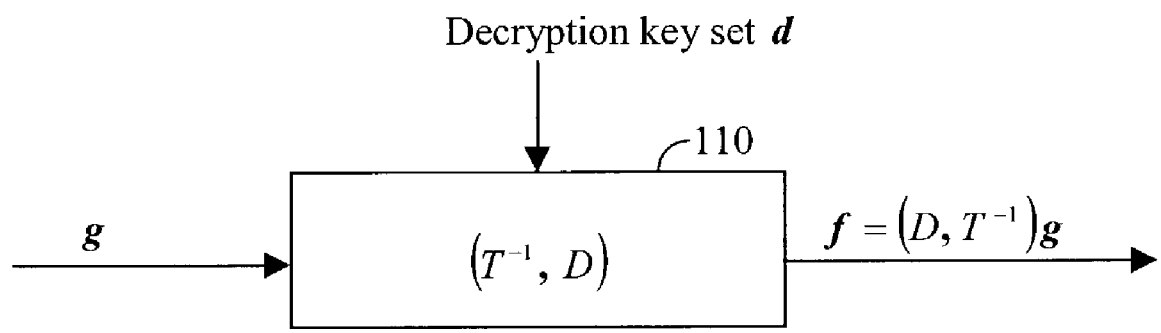
FIG. 1B (Transform-decryption system)

One-Level DWT

One-Level IDWT

Implementation of DWT

Implementation of IDWT

Implementation of Another DWT

Implementation of Another IDWT $m \longrightarrow$ UNIT A $\longrightarrow e = (e_1, \cdots, e_p)$ FIG. 13A ( Key set generation for transform-encryption)

UNIT A in FIG. 13A)

For secret message $m = (m(1), \cdots, m(n))$ of $n$ non-negative integers, generate encryption key set $e = (e_1, \cdots, e_p)$ as follows:

Let
$$m(n+1) = m(1), \cdots, m(2n-1) = m(n-1).$$

For $\ell = 1, \cdots, p$, $$e_\ell = \left(2^{r(\ell)}, (-1)^{m(\ell)} q(\ell)\right)$$

with $$r(\ell) \equiv m(\ell) \pmod{M}, \quad 0 \le r(\ell) < m(\ell);$$

$$q(\ell) \equiv m(\ell+1) \pmod{N}, \quad 0 \le q(\ell) < m(\ell+1).$$

FIG. 13B $m \longrightarrow$ UNIT B $\longrightarrow d = (d_1, \cdots, d_p)$

Key set generation for transform-decryption

FIG. 13C

UNIT B in FIG. 13C

For secret message $m = (m(1), \cdots, m(n))$ and encryption key set in FIG. 13B,
generate decryption key set $d = (d_1, \cdots, d_p)$ as follows:

Let $$m(n+1) = m(1), \cdots, m(2n-1) = m(n).$$

For $\ell = 1, \cdots, p,$ $$d_\ell = (c,b)_\ell = \left(2^{-r(\ell)}, (-1)^{m(\ell)} q(\ell)\right)$$

with $r(\ell) \equiv m(\ell) \pmod{M}, \quad 0 \leq r(\ell) < m(\ell)\ ;$ $q(\ell) \equiv m(\ell+1) \pmod{N}, \quad 0 \leq q(\ell) < m(\ell+1).$

FIG. 13D

Encoder, Decoder Procs. (code)

Sender phone (with cryptosystem)

Receiver phone (without cryptosystem)

| | | | | | | | | | | | | |
|---|---|---|---|---|---|---|---|---|---|---|---|---|
| Ground Level | 0 | 0 | 1 | 1 | 0 | 1 | 0 | 0 | 1 | 1 | 0 | 0 |

| Level 1 | 0 0 1 1 0 | 1 0 0 1 1 0 0 |
|---|---|---|

| Level 2 | 0 0 | 1 1 0 | 1 0 0 | 1 1 0 0 |
|---|---|---|---|---|

| Level 3 | 0 0 | 1 1 | 0 | 1 | 0 0 | 1 1 | 0 0 |
|---|---|---|---|---|---|---|---|

FIG. 24

| | $x_1$ | $x_2$ | $x_3$ | $x_4$ | $x_5$ | $x_6$ | $x_7$ | $x_8$ | $x_9$ | $x_{10}$ | $x_{11}$ | $x_{12}$ |
|---|---|---|---|---|---|---|---|---|---|---|---|---|
| Ground Level | 0 | 0 | 1 | 1 | 0 | 1 | 0 | 0 | 1 | 1 | 0 | 0 |

| | $x_3$ $x_4$ $x_6$ $x_9$ $x_{10}$ | $x_1$ $x_2$ $x_5$ $x_7$ $x_8$ $x_{11}$ $x_{12}$ |
|---|---|---|
| Level 1 | 0 0 1 1 0 | 1 0 0 1 1 0 0 |

| | $x_6$ $x_9$ | $x_3$ $x_4$ $x_{10}$ | $x_1$ $x_7$ $x_8$ | $x_2$ $x_5$ $x_{11}$ $x_{12}$ |
|---|---|---|---|---|
| Level 2 | 0 0 | 1 1 0 | 1 0 0 | 1 1 0 0 |

| | $x_6$ $x_9$ | $x_3$ $x_4$ | $x_{10}$ | $x_1$ | $x_7$ $x_8$ | $x_2$ $x_5$ | $x_{11}$ $x_{12}$ |
|---|---|---|---|---|---|---|---|
| Level 3 | 0 0 | 1 1 | 0 | 1 | 0 0 | 1 1 | 0 0 |

FIG. 25

Ground Level: | 0 | 1 | 1 | 1 | 0 | 1 | 0 | 0 | 1 | 1 |

Level 1: | 0 | 1 | 1 | 1 | 0 | 1 |  | 0 | 0 | 1 | 1 |

Level 2: | 0 | 1 | 1 | 1 |  | 0 | 1 |  | 0 | 0 |  | 1 | 1 |

Level 3: | 0 | 1 | 1 |  | 1 |  | 0 | 1 |

Level 4: | 0 | 1 |  | 1 |

Level 5: | 0 | 1 | 1 | 1 | 0 | 1 | 0 | 0 | 1 | 1 |

FIG. 26

|  | $x_1$ | $x_2$ | $x_3$ | $x_4$ | $x_5$ | $x_6$ | $x_7$ | $x_8$ | $x_9$ | $x_{10}$ | Wavelet Coefs. |
|---|---|---|---|---|---|---|---|---|---|---|---|
| Ground Level | 0 | 1 | 1 | 1 | 0 | 1 | 0 | 0 | 1 | 1 | Binary Key |

Level 1: columns $x_2, x_3, x_4, x_6, x_9, x_{10}$ | $x_1, x_5, x_7, x_8$
| 0 | 1 | 1 | 1 | 0 | 1 | | 0 | 0 | 1 | 1 |

Level 2: $x_3, x_4, x_6, x_{10}$ | $x_2, x_9$ | $x_7, x_8$ | $x_1, x_5$
| 0 | 1 | 1 | 1 | | 0 | 1 | | 0 | 0 | | 1 | 1 |

Level 3: $x_4, x_6, x_{10}$ | $x_3$ | $x_9$ | $x_2$
| 0 | 1 | 1 | | 1 | | 0 | | 1 |

Level 4: $x_6, x_{10}$ | $x_4$
| 0 | 1 | | 1 |

Level 5: $x_{10}, x_6, x_4, x_3, x_9, x_2, x_7, x_8, x_1, x_5$
| 0 | 1 | 1 | 1 | 0 | 1 | 0 | 0 | 1 | 1 |

FIG. 27

SYSTEM AND METHOD FOR REAL-TIME SECURE COMMUNICATION BASED ON MULTI-LEVEL TRANSFORM AND ENCRYPTION

RELATED APPLICATIONS

This application claims priority to U.S. provisional application No. 60/344,842, filed Oct. 22, 2001, and U.S. utility patent application Ser. No. 10/154,795, filed May 23, 2002, now U.S. Pat. No. 6,898,288, which are both hereby incorporated by reference.

The present invention relates generally to cryptography, and in particular, to a method for real-time encryption based on multi-level or multi-scale transforms, using a set of very short keys for the transform operation, and a longer symmetric key for encryption of the transformed data.

BACKGROUND OF THE INVENTION

Cryptography has a very long and fascinating history that dates back to the Egyptian days, some four thousand years ago. However, the best recorded early cryptosystem is the Caesar cipher, used by Julius Caesar of the Roman Empire for military use. The secret key of the Caesar cipher is a single whole number n that governs the number of positions by which all letters of a message to be sent are shifted to the right, in a cyclic fashion. This is a symmetric-key encryption system, since the same key, n, is used to decrypt the message by shifting all letters to the left by n positions, again in a cyclic fashion, to receive the message.

Indeed, symmetric-key cryptosystems, based on elementary mathematical operations of permutations, congruence arithmetic, matrix multiplications, iterations, etc., had been the only ones available till the mid 1970's, when Diffie and Hellman introduced public-key cryptography. Both DES (Data Encryption Standard) and AES (Advanced Encryption Standard) are based on symmetric-key encryption/decryption algorithms. In other words, the decryption key is the same as, or can be easily derived from, the encryption key.

There are two general approaches in symmetric-key cryptosystem design, namely block ciphers and stream ciphers, with block ciphers being more popular due to the success of DES. A block cipher breaks up a plaintext message into blocks of fixed lengths and encrypts one block at a time. Substitution ciphers, transposition ciphers, and product ciphers are block ciphers, with the third scheme being a combination of the first two. On the other hand, a stream cipher treats each letter (or word) of a plaintext as a block of length one to reduce error propagation and the need for cache memory. It is based on generation of a key-stream that assigns a ciphertext one letter (or word) at a time.

In contrast to symmetric-key cryptosystems, public-key cryptography is based on asymmetric-key encryption, with a public key for encryption and a private key for decryption. The first practical public-key encryption scheme was introduced by Rivest, Shamir, and Adleman in 1978, and since then there has been a great deal of mathematical research activities in cryptography that engage modem mathematical tools such as Elliptic Curves and Hyperelliptic Curves.

However, even with recent advances in mathematical research, the significant disadvantages of public-key encryption, particularly the need for extraordinarily long keys and the extremely slow throughput rate, cannot be avoided. On other hand, current symmetric-key approaches require either large blocks (in the case of block ciphers) or long key-streams (in the case of stream ciphers), and for both block and stream ciphers to be secure it is recommended to apply the ciphers multiple times, which in turn requires a larger key-space (or key-set). In this regard, it is worthwhile to mention that even the Rijndael algorithm (in AES) processes an encryption operation in ten rounds when the block and key lengths are both 128 bits, and the key is expanded to a much larger key-space, as large as 128 times the number of blocks.

In summary, current symmetric-key cryptosystems are designed for encryption of long messages only, and hence, are not suitable for real-time applications, such as telecommunications, in which latency cannot be tolerated. On the other hand, although public-key cryptosystems are primarily used for encryption of short messages, their disadvantages as discussed above disqualify them as real-time communication encryption tools.

In this regard, it is noted that the frequency content of voice, image, and video data in telecommunication are highly correlated, and the relatively recent mathematical theory and methods of wavelets have proved to provide very powerful algorithms for processing such data. However, time-frequency or time-scale approaches have not been considered for encryption of voice, image, and video data for real-time communication applications in the literature. The present invention is the first to incorporate both time-scale (time-frequency) and encryption schemes for such applications. In particular, this invention introduces the use of encryption keys in the operation of wavelet transforms to provide additional security.

SUMMARY OF THE INVENTION

A stream of data is encoded by applying a multilevel transform to the stream of data, each level of the transform producing one or more transform coefficients for each block of a sequence of blocks in the stream of data. Encryption is applied to at least a subset of the transform coefficients produced by a least one level of the multilevel transform. Furthermore, at least one level of the multilevel transform is applied to the encrypted transform coefficients. The multilevel transform and encryption operations generate a result set of transform coefficients. The result set of transform coefficients may be encrypted, using a symmetric key encryption, to generate an output data stream that is then transmitted from a sending device to a receiving device. The encoding method may be performed in real time, producing the output data stream at a same rate as the stream of data is presented for encoding.

Another aspect of the present invention is a method and system for generating a symmetric-key based on a secret message shared by the sender (or sender's communication device) and receiver (or receiver's communication device), as well as other information such as the destination telephone number, time and date of the telephone call. A further aspect of the present invention is the use of the symmetric key for real-time encryption of the (encoded) decomposed coefficients in $H_1, \ldots, H_n, L_n$.

BRIEF DESCRIPTION OF THE DRAWINGS

Additional objects and features of the invention will be more readily apparent from the following detailed description and appended claims when taken in conjunction with the drawings.

FIG. 1A shows a general transform-encryption system, where the transform T and the encryption algorithm E are interweaved to encrypt the time-scale (or time-frequency) transform of an input signal f using an input encryption key set e.

FIG. 1B shows the inverse operation of the transform-encryption in FIG. 1A, where $T^{-1}$ is the inverse of the transform T, D is the decryption algorithm corresponding to encryption algorithm E, and the decryption key set d is associated with the encryption key set e.

FIG. 13A shows a general system for generating an encryption key set e (used in FIG. 1A, FIG. 2A, and FIG. 5) generated using a secret message m of non-negative integers.

FIG. 13B shows a preferred embodiment of the Unit A in FIG. 13A.

FIG. 13C shows a general system for generating the decryption key set d (used in FIG. 1B, FIG. 2B, and FIG. 6) that corresponds to the encryption key set e in FIG. 13A and is generated using the same message m.

FIG. 13D shows an embodiment of the unit B in FIG. 13C.

FIG. 24 shows how binary key segment (e.g., a session key) can be used to generate multi-level binary keys.

FIG. 25 demonstrates how the binary tree generated in FIG. 24 is used to encrypt the transformed coefficients $x_1, \ldots, x_{12}$, using the data shuffling methodology shown in FIG. 22.

FIG. 26 shows another example of a five level binary tree built using the procedure depicted in FIG. 24.

FIG. 27 demonstrates how the transformed sequence $x_1, \ldots, x_{10}$ is encrypted by applying all levels of the binary tree in FIG. 26.

DETAILED DESCRIPTION OF THE PREFERRED EMBODIMENTS

Figure 2A:
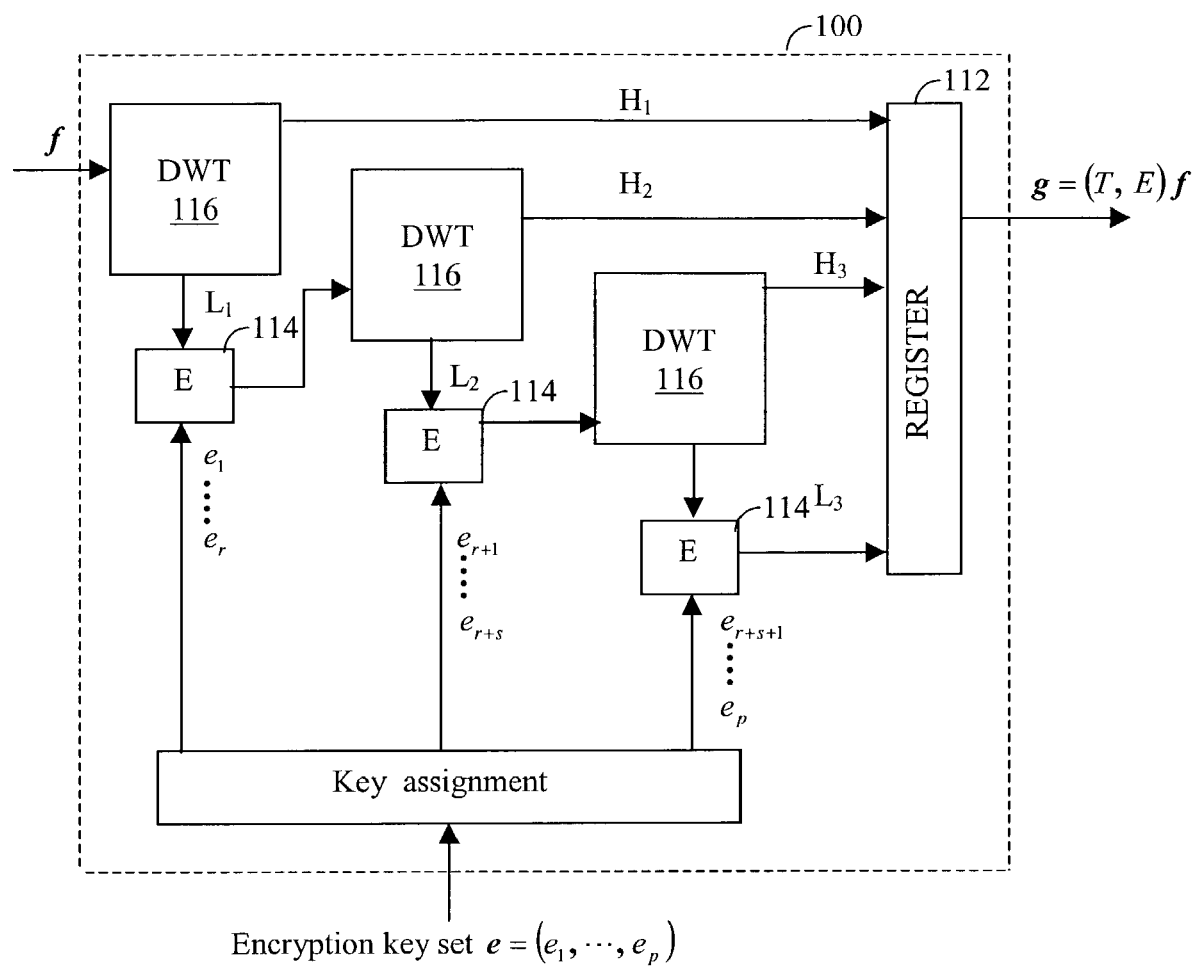
FIG. 2A shows a preferred embodiment of the transform-encryption system in FIG. 1A, where T is an n-level wavelet (or wavelet-like) transform, DWT, with n=3 only for demonstrative purposes. The keys $e_1, \ldots, e_p$ of the key set e are assigned to encrypt the coefficients of the transform in the low-frequency bands $L_1$, $L_2$, and $L_3$. The output transformed and/or encrypted coefficients in $H_1$, $H_2$, $H_3$ and $L_3$ pass through a register (with or without memory) to go to a (global) symmetric-key encryptor.

Mathematical transforms constitute the core of the foundation of virtually all areas of signal processing. In particular, the Fourier approach, including DCT (discrete cosine transform) and FFT (fast Fourier transform), applied to extract frequency information from time and spatial data (such as acoustic and image data, respectively), has made significant impact on the past and current development in the consumer electronics and telecommunications industries. With the demand for new features and higher performance at lower cost, these industries have been investigating the incorporation of, and/or replacement by, other mathematical transforms that can be applied to extract both time and frequency information most effectively. The wavelet transform has been by far the most popular choice, both for proprietary development and for industry standards, such as JPEG 2000.

The present invention introduces the use of wavelet transforms in cryptography. In the following description, as well as in the accompanying drawings, the terms DWT (discrete wavelet transform) and IDWT (inverse discrete wavelet transform) include all formulations of wavelet transforms and wavelet-like transforms. See U.S. Pat. No. 5,909,518 "System and Method For Performing Wavelet-Like And Inverse Wavelet-Like Transformation Of Digital Data Using Only Add And Shift Arithmetic Operations," which is hereby incorporated by reference as background information. In addition, although the embodiments described here use DWT, other embodiments of the present invention may use other types of transforms.

In applying a wavelet transform (or DWT, which stands for "discrete wavelet transform") to analyze one-dimensional data, such as digital voice data, the data sequence is decomposed into the sum of a low-frequency band ($L_1$) and high-frequency band ($H_1$). This is the first level decomposition. The low-frequency band $L_1$ is then treated as the signal itself, and DWT is applied to $L_1$ yielding $L_2$ and $H_2$. In repeating this process n times, where $n \geq 2$, the original signal is decomposed into the sum of $H_1, \ldots, H_n$, and $L_n$. Since downsampling by 2 is applied in each DWT operation, the total number of decomposed "coefficients" remains the same as the number of "coefficients" of the input signal representation. For further background information regarding wavelet transforms, see the books: C. K. Chui, "An Introduction to Wavelets," 1992; and C. K. Chui, "Wavelets: A Mathematical Tool for Signal Analysis, 1997, which are hereby incorporated by reference.

In one aspect of the present invention, an encryption key set is applied to encrypt the first low-frequency band $L_1$ before the second level DWT is performed. Hence, both $H_2$ and $L_2$ are encrypted. A different key set is then applied to the already encrypted output $L_2$ before the third level DWT is performed to it, and so forth. Consequently, with the exception of $H_1$, all the other decomposed components $H_2, \ldots, H_n, L_n$ of the input signal are encrypted. Observe that encryption was performed on the low-frequency bands $L_2, \ldots, L_{n-1}$, which do not show up in the output wavelet components. For efficiency, only a selected few of these low-frequency bands are encrypted, but for added security, the encryption keys are different.

The encryption key sets are preferably generated by a short secret message, only known to the sender (or sender's communication device) and receiver (or receiver's communication device). A method for generating these encryption keys and corresponding decryption keys is disclosed in this document and comprises another aspect of the present invention. On the other hand, a method and system for sending this secret message securely (without applying public-key encryption) was disclosed in U.S. patent application Ser. No. 10/154,795, filed on May 23, 2002.

The present invention may be implemented in cellular telephones, regular (land line) telephones, teleconferencing systems, personal digital assistants (PDA's), and many other devices. The present invention may be used to provide real time encryption and decryption of data streams being transmitted from one device to another, or the two-way exchange of data streams between a pair of such devices.

FIGS. 1A and 1B show a transform-encryption system 100 and the corresponding transform-decryption system 110, respectively. In these systems, encryption and the decryption operations are interweaved with DWT and IDWT operations. The transform-encryption system 100 uses an encryption key set e and the transform-decryption system 110 uses a decryption key set d. These systems become the ordinary or standard DWT and IDWT systems when the encryption and decryption keys are not used. The output data, called transformed coefficients, of the transform-encryption system 100, with or without applying the encryption key set, is preferably encrypted by applying any symmetric-key encryption scheme to the output data, including a symmetric-key encryption scheme described below. As will be understood by those skilled in the art, a symmetric-key encryption, such as DES (Data Encryption Standard) or the encryption methods described in this document, may be applied either to the input data or to the output data of any transform system, or to both the input and output data for stronger security.

Transform-Encryption Systems

A preferred embodiment of the transform-encryption system 100 is shown in FIG. 2A, where only three transform levels of the DWT are used for demonstrative purposes. In general, any number of transform levels can be used, depending on the security requirement and, in real-time applications, the number of computations that can be performed while maintaining real-time performance. An encryption key set $e=(e_1, \ldots, e_p)$ is provided to the system 100 in FIG. 2A, where p is the number of wavelet (i.e., highpass H) or scaling (i.e., lowpass L) coefficients to be encrypted. Each box 114 labeled "E" in FIG. 2A represents a symmetric key encryption operation, and each box 116 labeled "DWT" in FIG. 2A represents a DWT operation on the input data received by that DWT box 116.

Since all the scaling coefficients, with the exception of the last set (i.e., the L output of the final DWT level), are used only for internal operations of the DWT, they are encrypted in this embodiment to provide stronger security. An adversary cannot decrypt the output of the transform-encryption system 100 to produce plaintext. To break the encryption provided by this embodiment, it is necessary to "break" into the transform-encryption system, which makes the security provided by this system very strong despite its low level of computational complexity. For higher security, coefficient-wise encryption may also be applied to the wavelet coefficients in $H_1$, but not shown in FIG. 2A. On the other hand, in embodiments (devices) with less processing capability, only a predefined subset of the scaling coefficients in $L_1, L_2, L_3$ are encrypted, and the rest are not encrypted, thereby reducing the processing load associated with use of the invention. The transform coefficients in $H_1, H_2, H_3$ and $L_3$, encrypted or not, pass through a register 112 before going to a symmetric-key encryptor, sometimes herein called the global encryptor. Preferred embodiments of the global encryptor are described below with reference to FIG. 22, and FIG. 24–FIG. 27.

Figure 2B:
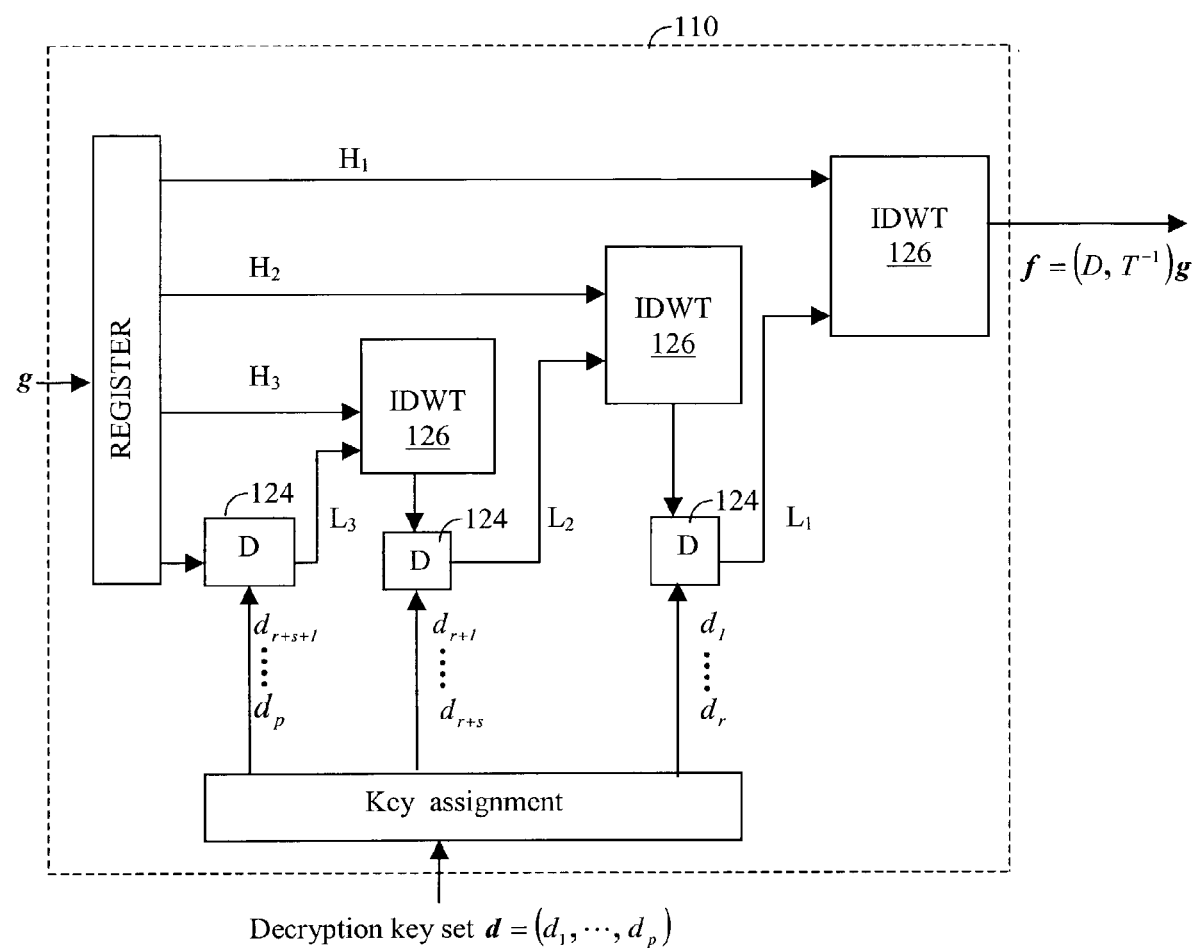
FIG. 2B shows the inverse operation of the transform-encryption system in FIG. 2A, where IDWT is the inverse of DWT, D is the decryption unit corresponding to E in FIG. 2A, and $d_1, \ldots, d_p$ of the decryption key set d are inverses of the encryption keys $e_1, \ldots, e_p$ respectively.

FIG. 2B shows the transform-decryption system 110 that performs the inverse operations of the transform-encryption system 110 shown in FIG. 2A. Hence, the same number p of decryption keys $d_1, \ldots, d_p$ are used to decrypt the scaling coefficients in $L_1, L_2, L_3$ for performing the three levels of IDWT, respectively. It is noted, for example, that the final level of IDWT cannot be performed without first decrypting the output of the second level (i.e., second to the last in this example) of IDWT by using the keys $d_1, \ldots, d_r$. The entire set $d=(d_1, \ldots, d_p)$ of decryption keys is the inverse of the encryption key set $e=(e_1, \ldots, e_p)$. Each box 124 labeled "D" in FIG. 2B represents a symmetric key decryption operation, and each box 126 labeled "IDWT" in FIG. 2B represents an IDWT operation on the input data received by that IDWT box 126.

Figure 3:
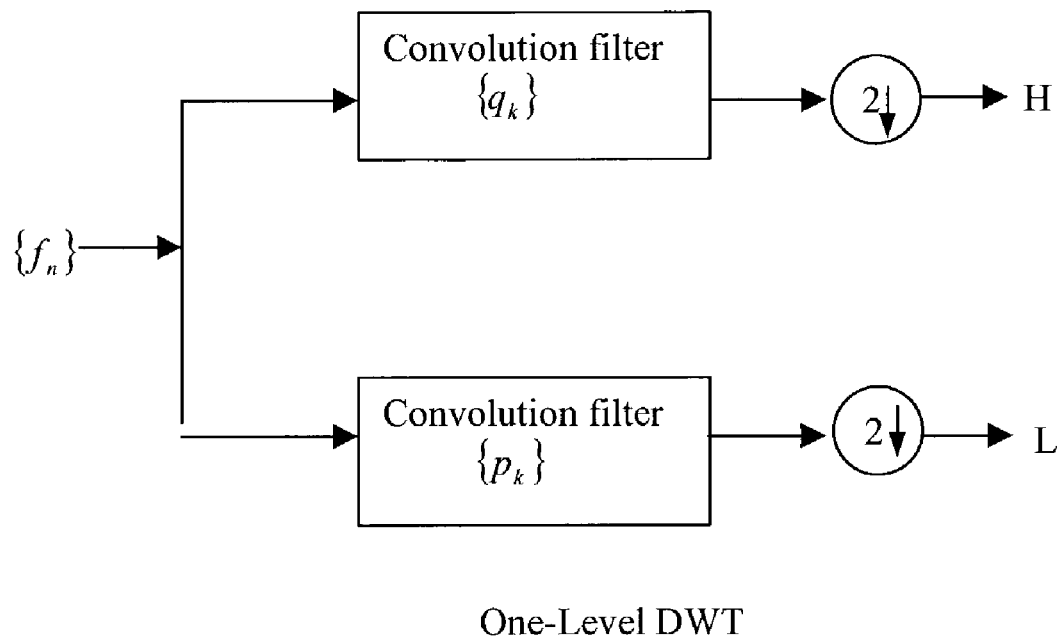
FIG. 3 shows how a typical one-level DWT works, where $\{p_k\}$ and $\{q_k\}$ are lowpass and highpass scaling/wavelet filters.

Referring to FIG. 3, it is well known that the operations in DWT are discrete convolutions with a highpass filter $\{q_k\}$ and a lowpass filter $\{p_k\}$ followed by downsampling, which is represented by the symbol $2\!\!\downarrow$ in FIG. 3. Downsampling means keeping or using only half the filtered coefficients. In a preferred embodiment, downsampling is accomplished by keeping only the odd-indexed filtered coefficients, dropping the even-indexed filtered coefficients.

Figure 4:
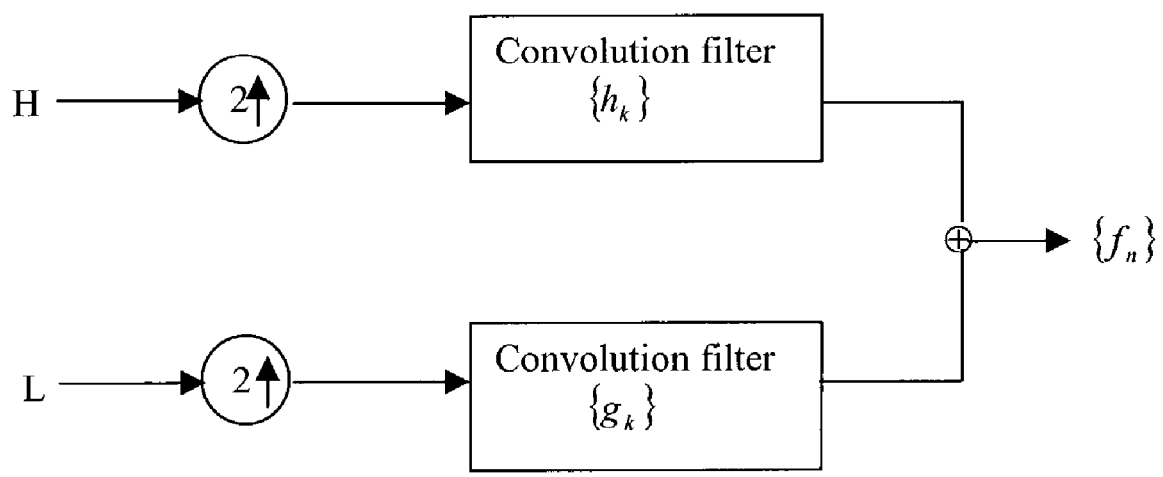
FIG. 4 details how a typical one-level IDWT works, where the pair $\{g_k\}$, $\{h_k\}$ is the inverse of the pair $\{p_k\}$, $\{q_k\}$ in the sense of filter-bank operations, and 2↑ denotes upsampling, which means that one zero is added in-between every two consecutive filter coefficients.

Referring to FIG. 4, the operations of IDWT involve first upsampling (by inserting a zero value between every two consecutive coefficients) and then by performing discrete convolutions with another pair of highpass and lowpass filters $\{h_k\}$ and $\{g_k\}$, respectively. The two pairs of filters must be designed to satisfy the filter-bank perfect recovery criterion, as described in the wavelet literature (e.g., the two books written by Charles K. Chui, cited above).

Two sets of DWT and IDWT filters are used in a preferred embodiment of this invention. The first set is:

$$q_0 = \frac{1}{2}, q_1 = -\frac{1}{2};$$

$$p_0 = \frac{1}{2}, p_1 = \frac{1}{2};$$

Figure 7:
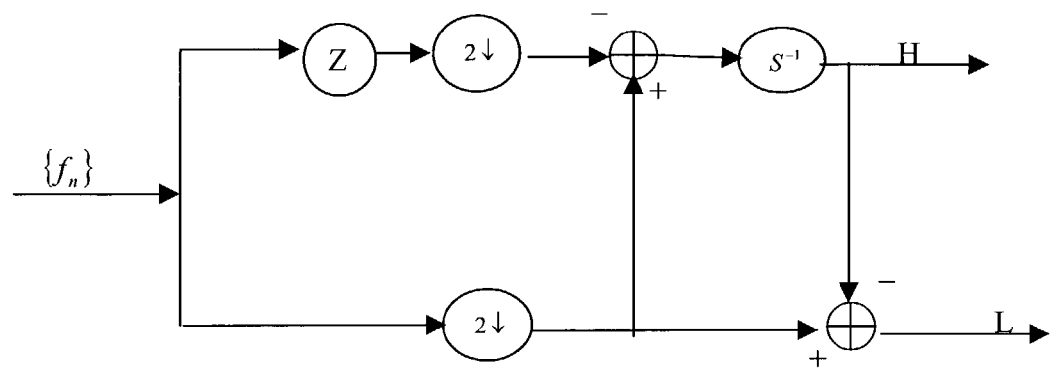
FIG. 7 demonstrates a preferred implementation of a special DWT (called the Haar wavelet transform), with z denoting forward shift (i.e., $f_0, f_1, \ldots \rightarrow f_1, f_2, \ldots$) and $S^{-1}$ denoting binary backward bit shift (i.e., division by 2).
Figure 8:
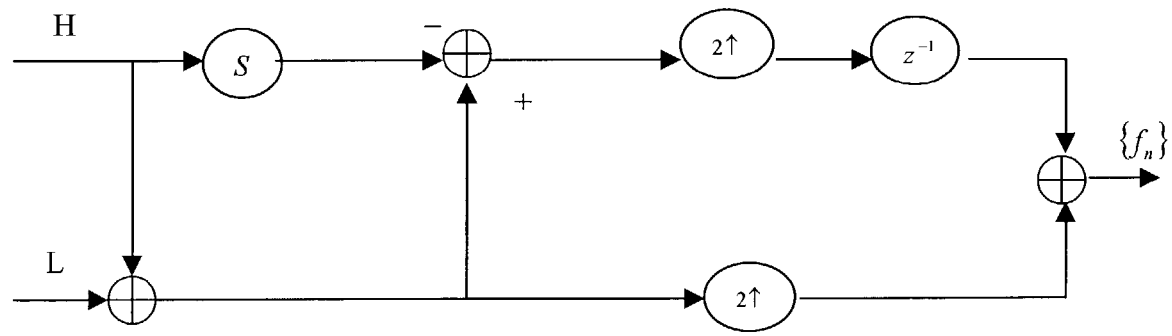
FIG. 8 shows a preferred implementation of the inverse Haar wavelet transform IDWT corresponding to the DWT in FIG. 7, with $z^{-1}$ denoting backward shift (i.e., $f_1, f_2, \ldots \rightarrow f_0, f_1, \ldots$) and S denoting binary forward bit shift (i.e. multiplication by 2).

$h_0=1, h_1=-1$;
$g_0=1, g_1=1$, with $p_k=q_k=g_k=h_k=0$ for $k\neq 0,1$. This is called the Haar wavelet transform in the wavelet literature. However, in a preferred embodiment, the filtering operations shown in FIG. 3 and FIG. 4 are performed efficiently, using only binary shift (also called bit shift) and add/subtract operations as shown in FIG. 7 and FIG. 8. In FIGS. 7 and 8 (as well as in FIGS. 9 and 10), the symbol Z represents a delay of the coefficient data stream by one sample, and the symbol $Z^{-1}$ represents an acceleration (the reverse of a delay) of a data stream by one sample. The symbol S represents a left binary shift operation (i.e., a multiple by 2 operation), and the symbol $S^{-1}$ represents a right binary shift operation (also called a bit shift operation) (i.e., a divide by 2 operation).

The second set of DWT and IDWT filters in the preferred embodiment is $$q_0 = \frac{1}{2}, q_1 = -1, q_2 = \frac{1}{2};$$

Figure 9:
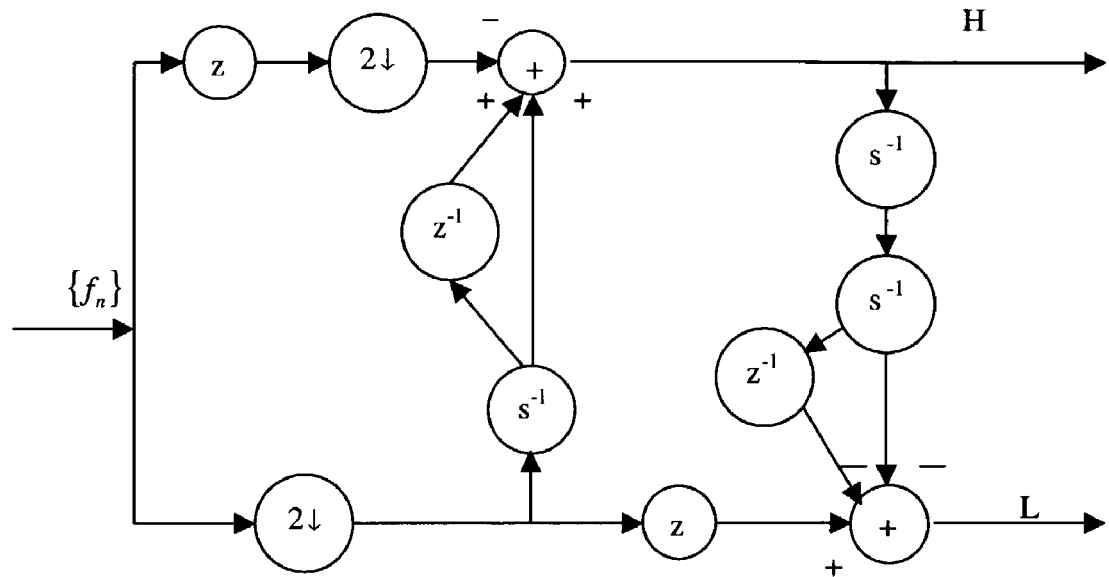
FIG. 9 shows a preferred implementation of a more complex DWT than the DWT shown in FIG. 7.
Figure 10:
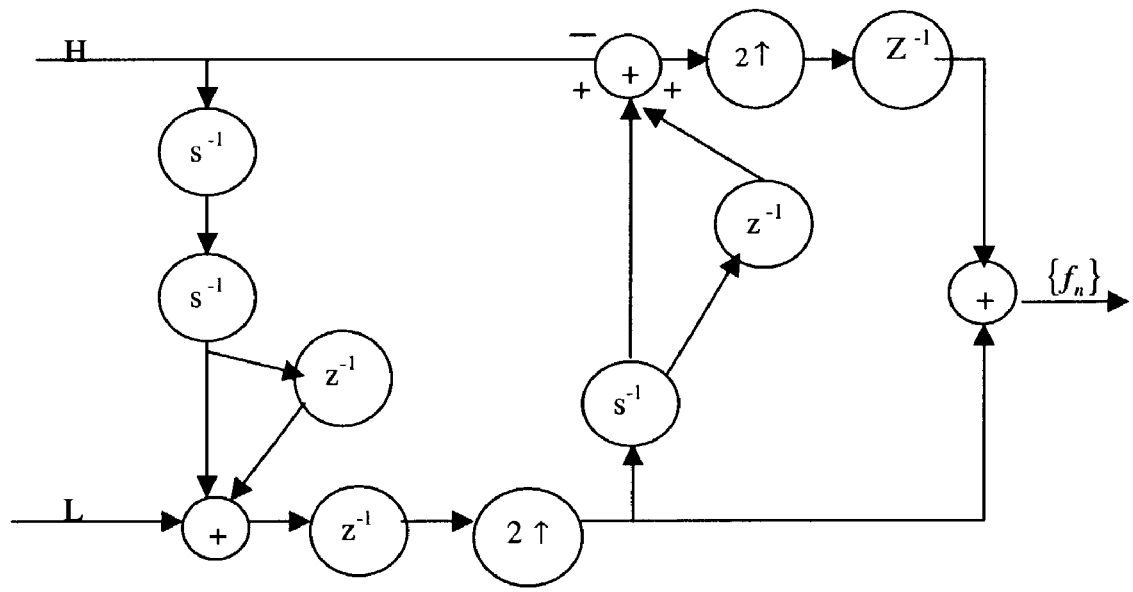
FIG. 10 shows a preferred implementation of an IDWT that corresponds to the DWT in FIG. 9.

-continued $$p_{-2} = -\frac{1}{8}, p_{-1} = \frac{1}{4}, p_0 = \frac{3}{4}, p_1 = \frac{1}{4}, p_2 = -\frac{1}{8};$$

$$h_{-1} = \frac{1}{8}, h_0 = \frac{1}{4}, h_1 = -\frac{3}{4}, h_2 = \frac{1}{4}, h_3 = \frac{1}{8};$$

$$g_{-1} = \frac{1}{2}, g_0 = 1, g_1 = \frac{1}{2},$$

with $p_j=0$, $q_l=0$, $g_l=0$, $h_m=0$ for $j\neq -2, \ldots, 2$; $k\neq 0,1,2$; $l\neq -1,0,1$; and $m\neq -1, \ldots, 3$. Also, in a preferred embodiment for low cost application, the filtering operations shown in FIG. 3 and FIG. 4 for this second set of DWT and IDWT filters are implemented as shown in FIG. 9 and FIG. 10.

Figure 5:
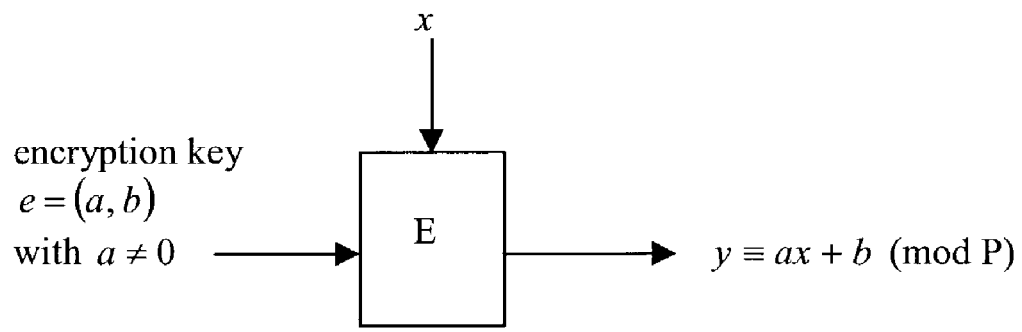
FIG. 5 shows an encryption algorithm E, such as for use in the systems of FIG. 1A and FIG. 2A, using a key e from a key set e to encrypt each coefficient, where P is a pre-assigned positive integer that depends on the allowable bit-depth of the communication device.
Figure 6:
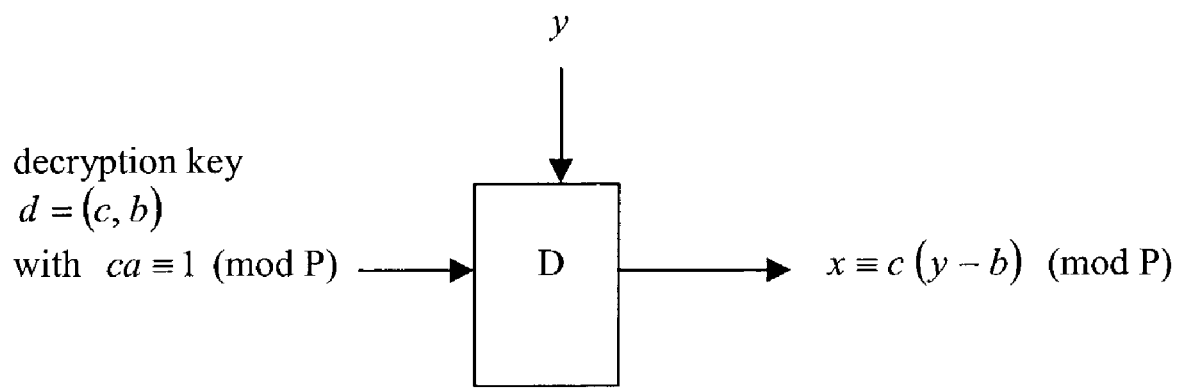
FIG. 6 shows a decryption algorithm D, corresponding to the encryption algorithm E in FIG. 5, where c is the (mod P) inverse of a in FIG. 5.

The encryption (E) and decryption (D) operations shown in FIG. 2A and FIG. 2B, respectively, should be computationally efficient. FIG. 5 and FIG. 6 depict an encryptor and decryptor, respectively, which are simple and use computationally efficient symmetric key encryption and decryption. The choice of the positive integer P used in the encryptor and decryptor of FIG. 5 and FIG. 6, respectively, depends on the allowable bit-depth of the processor in the device. The decryption key in FIG. 6 is the inverse of the encryption key in FIG. 5.

For low-cost implementations, only add, subtract and binary shift operations are used to perform the encryption and decryption operations, as well as the DWT and IDWT filtering operations. Such implementations are shown for the DWT and IDWT filtering operations in FIG. 7 and FIG. 8 (for a Haar wavelet transform and its inverse), and in FIG. 9 and FIG. 10 (for a more complex wavelet transform and its inverse transform). For the encryption operation E and decryption operation D in FIG. 5 and FIG. 6, respectively, multiplications by a and c are accomplished by bit-shifts, while the b component of the key value is only added or subtracted. Examples of procedures for generating encryption and decryption keys that facilitate encryption and decryption operations using only add, subtract and bit shift operations are described below with reference to FIG. 13B and FIG. 13D.

Figure 11:
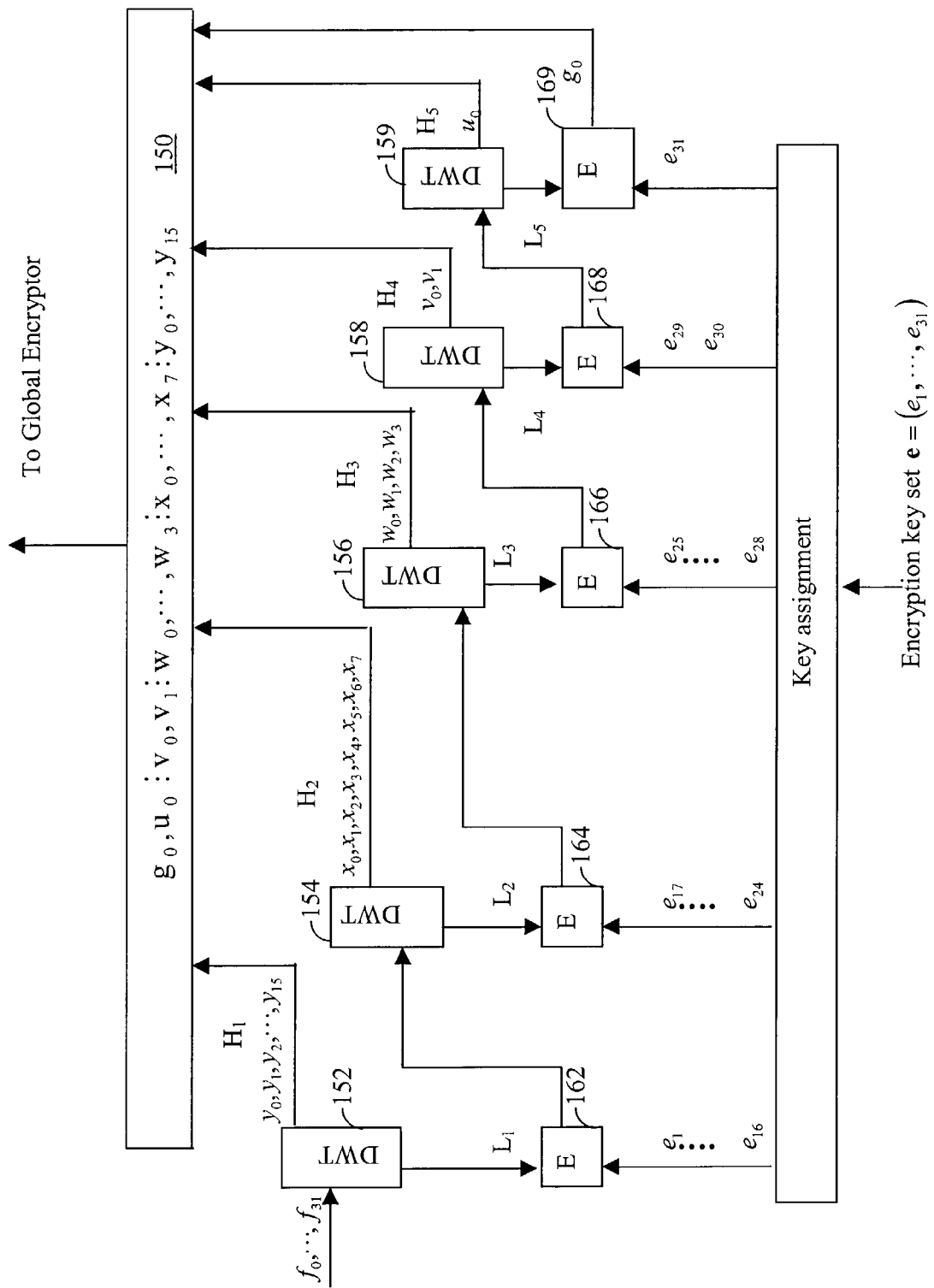
FIG. 11 displays a five-level Haar transform-encryption system.

For a detailed illustration, a five-level Haar wavelet transform is shown in FIG. 11. Blocks of 32 data values are transformed, encrypted and sent through a register 150 for keeping track of the block size and appropriate ordering. This unit or an appropriate substitute for it is needed since the input data sequence $f_0, f_1, \ldots, f_j, f_{j+1}, \ldots$ is processed without being physically divided into blocks. While the data sequence need not be divided into blocks for processing by the transform-encryption system, a distinct set of transform coefficients are produced for each block of 32 input data values. The need of ordering will be explained below.

For a five level Haar transform, the 16 scaling coefficients in $L_1$ (produced by the first level DWT 152) are needed. These coefficients are encrypted (by encryption step or module 162) by using keys $e_1, \ldots, e_{16}$ before being sent to the second level DWT 154, which in turn, outputs 8 scaling coefficients to be encrypted (164) by using 8 keys $e_{17}, \ldots, e_{24}$. The next (or third) DWT level 156 outputs 4 scaling coefficients that are encrypted (166) by using 4 keys $e_{25}, \ldots, e_{28}$, and the fourth DWT level 158 outputs two scaling coefficient encrypted (168) by using 2 keys $e_{29}, e_{30}$. Finally, the last DWT level 159 outputs 1 scaling coefficient which is encrypted (169) by the key $e_{31}$. The register 150 reverses the order of the blocks of the output. In other words, the blocks of output are stored in register 150 in the opposite order from which they are produced. Thus, the block $H_1$ which is the first output block is now stored in the last block in the register 150, the second output block $H_2$ is the second to the last (i.e., fourth) block in the register 150, the third output block $H_3$ remains third block in the register, the fourth output block $H_4$ sits in the second block in the register, and finally the scaling coefficient $g_0$ followed by the singleton $u_0$ in $H_5$ are in the first block in the register. Hence, in the design of the transform-encryption system, certain staging registers (or memory) are used. Through appropriate use of these staging registers or the like, a continuous stream of input data may be processed by the system shown in FIG. 11, while producing a set of 32 transform coefficients in register 150 for each block of 32 input data values.

The encryption steps or modules 162, 164, 166, 168 and 169 may use either the encryption techniques described herein, or other symmetric-key encryption techniques known to those skilled in the art.

The coefficients output by the multilevel transform system of FIG. 11 are preferably encrypted, for instance using the global encryptor described below (with reference to FIG. 22) or using another symmetric-key encryptor, prior to being transmitted to a receiving system. However, in some embodiments, real time processing will limit the number of computational steps applied to the received data stream, and in these embodiments the coefficients output by the multi-level transform system may be transmitted without further encryption.

Figure 12:
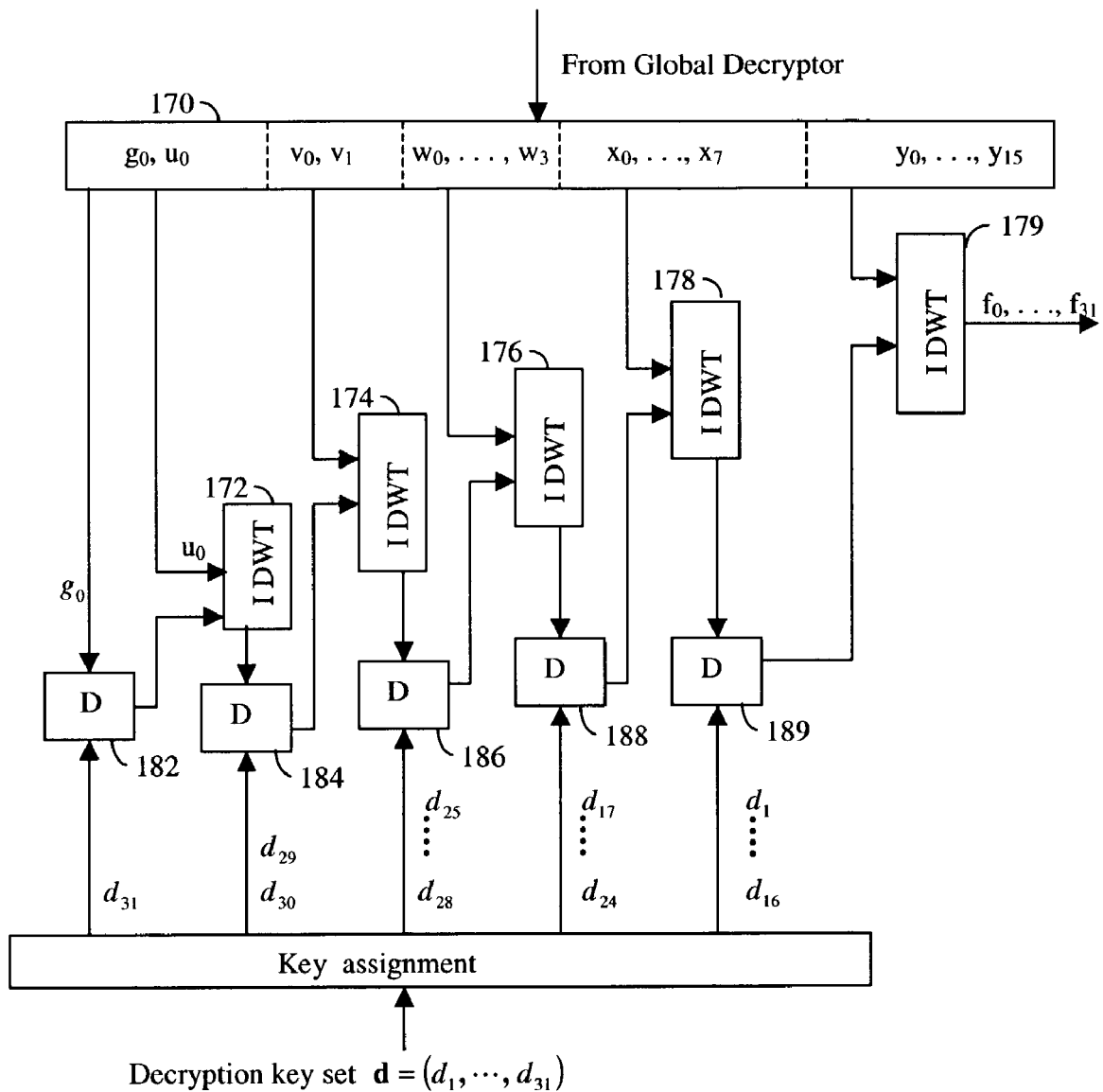
FIG. 12 displays a transform-decryption system that performs the inverse operations of the transform-encryption system in FIG. 11.

FIG. 12 shows a transform-decryption system that performs the inverse operations of those in FIG. 11. However, since the ordering has already been completed in the register in FIG. 11, the main function of the register 170 in FIG. 12 is to assign the coefficients to the appropriate units with appropriate precise timing, as follows. The first coefficient $g_0$ in the first block is assigned to the first decryptor D182, to be decrypted by using the key $d_{31}$, and the second coefficient in this first block is assigned to the first IDWT unit 172 when the decryption of $g_0$ is completed (and hence, a delay operation is used here). The output of the first IDWT 172 is sent to the second decryptor 184, decrypted by the keys $d_{29}$ and $d_{30}$, before being directed to the second IDWT unit 174. The function of the register 170 now is to send the second block to this IDWT 174 simultaneously (and hence, another delay operation is needed). This operation process continues using the third and fourth IDWT units 176, 178, and the third, fourth and fifth decryption units or modules 186, 188, 189. The final (or fifth) IDWT unit 179 receives both the final 16 decrypted coefficients and the final block of 16 coefficients from the register 170 at the same time to perform the inverse wavelet transform operation, yielding the 32 values of the original (input) sequence or plaintext $f_0$, $f_1$, ..., $f_{31}$ (from FIG. 11).

Both the encryption key set $e=(e_1, \ldots, e_p)$ and decryption key set $d=(d_1, \ldots, d_p)$ are generated from the same (secret) message m of non-negative integers (such as 0, ..., 9). FIG. 13A, with details shown in FIG. 13B, shows how the encryption key set is generated. Similarly, FIG. 13C, with details shown in FIG. 13B and FIG. 13D, shows how the decryption key set is generated. Observe that the only difference between $e_l$ and $d_l$ is that the forward bit-shift in $e_l$ is changed to a backward bit-shift in $d_l$, by the same number of bits, r(l). The encryption key set from FIG. 13A is suitable for use in the encryptor of FIG. 5, each successive key being used to encrypt a successive input value (e.g., a successive transform coefficient value).

Safe Delivery of Secret Key Generators

Figure 14:
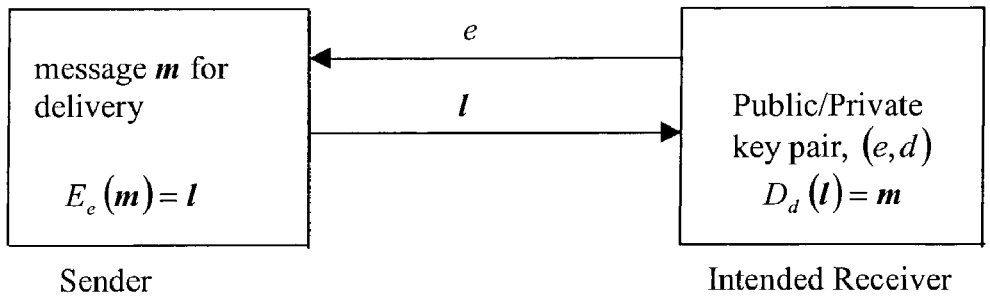
FIG. 14 shows how a secret message m is exchanged between the sender and intended receiver using public-key encryption.
Figure 15:
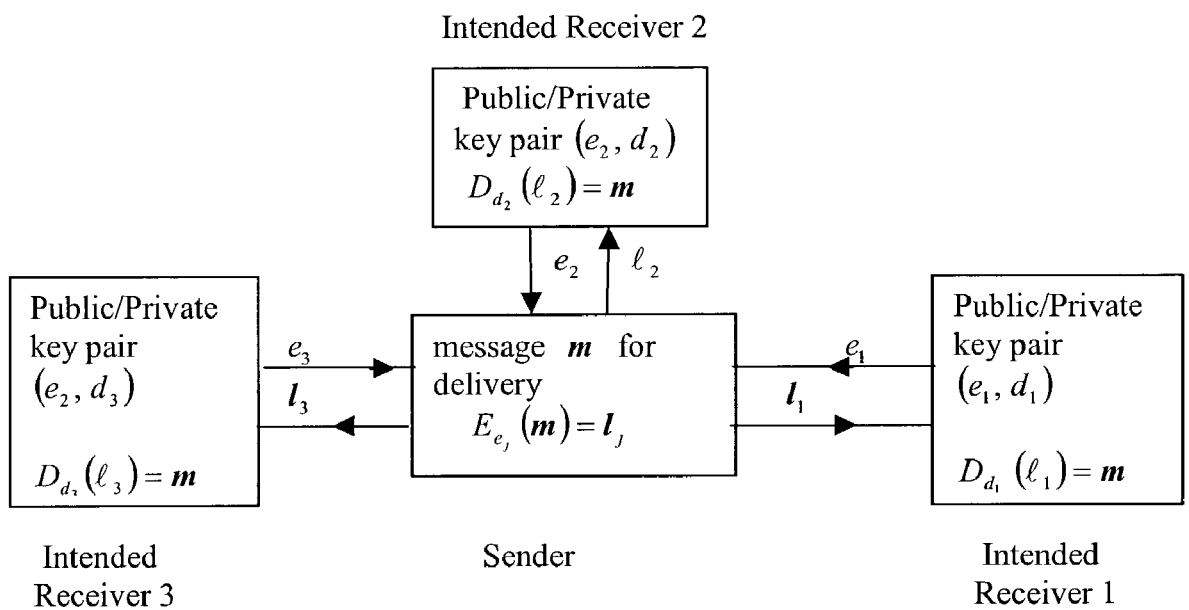
FIG. 15 shows how a secret message m is delivered by the sender to multiple receivers using public-key encryption.

One of the most important issues in cryptography is secure delivery of symmetric (or secret) keys. This is the so-called key-exchange problem. In this invention, the secret numerical message m for generating the encryption and decryption key sets e and d for the transform-encryption and transform-decryption systems disclosed above can be considered to be a secret key for exchange or delivery. As noted above, the prior art of public-key encryption can be used for to delivery or exchange a secret key m. FIG. 14 shows how this is down for two-party key-exchange. The receiver has a pair of keys (e,d), where e is a public key and d is its corresponding private key. The key pair is asymmetric, meaning that it takes a tremendous effort to recover the private key d from knowledge of the public key e, and that only the private key d can be used to decrypt what is encrypted with the public key e. To receive the secret numerical message m, the receiver sends (or publishes) the public key e. After encrypting m using public key e, the sender delivers the encrypted message m to the receiver who decrypts it using the private key d. FIG. 15 shows how this is accomplished for multiple receivers.

U.S. patent application Ser. No. 10/154,795, incorporated by reference above, discloses a new method and system for secure key exchange without use of public-key encryption. This method is used for safe delivery of the secret numerical message m in a preferred embodiment of the present invention. Using this method, the message m is encrypted by the sender with encryption key $e_s$, and the resulting encrypted message f is then sent by the sender to the intended receiver. The decryption key $d_s$ corresponding to the sender's encryption key $e_s$ is known only to the sender. After receiving this encrypted message f, the receiver "double locks" it by using another encryption key $e_r$ to further encrypt the encrypted message, and then returns the doubly-locked message g to the sender. The decryption key $d_r$ corresponding to the receiver's encryption key $e_r$ is known only to the receiver. This is shown in both FIG. 16A and FIG. 16B, with the additional security shown in FIG. 16B that the receiver also sends a password along with the doubly-locked message. In the system of FIG. 16B, the password sent by the receiver is verified by the sender before any further messages are sent by the sender, and if the password verification fails, the sender aborts the sequence of steps for sending the message m to the receiver.

Figure 16A:
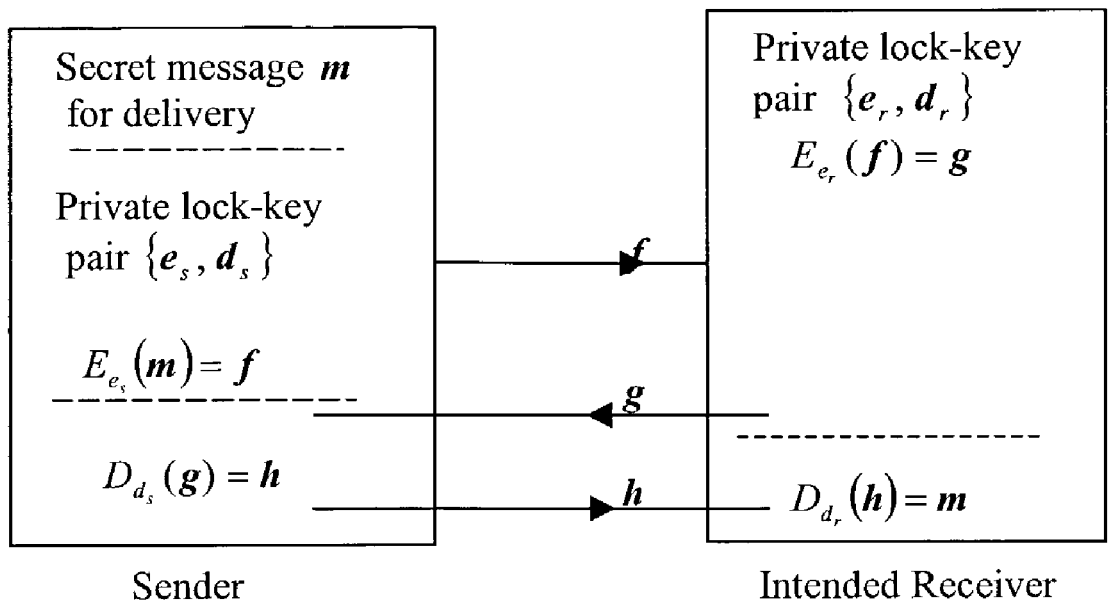
FIG. 16 shows a double-lock method of secret message delivery.
FIG. 16B shows a more secure version of the method shown in FIG. 16A, requiring a password from the intended receiver.
FIG. 16C is a multi-receiver application of the double-lock method for delivering a secret message.
FIG. 16D is the same as FIG. 16C, with additional security provided by requiring passwords from all intended receivers.
FIG. 16E is the same as FIG. 16C, with an additional step of a roll call by the sender.
Figure 16B:
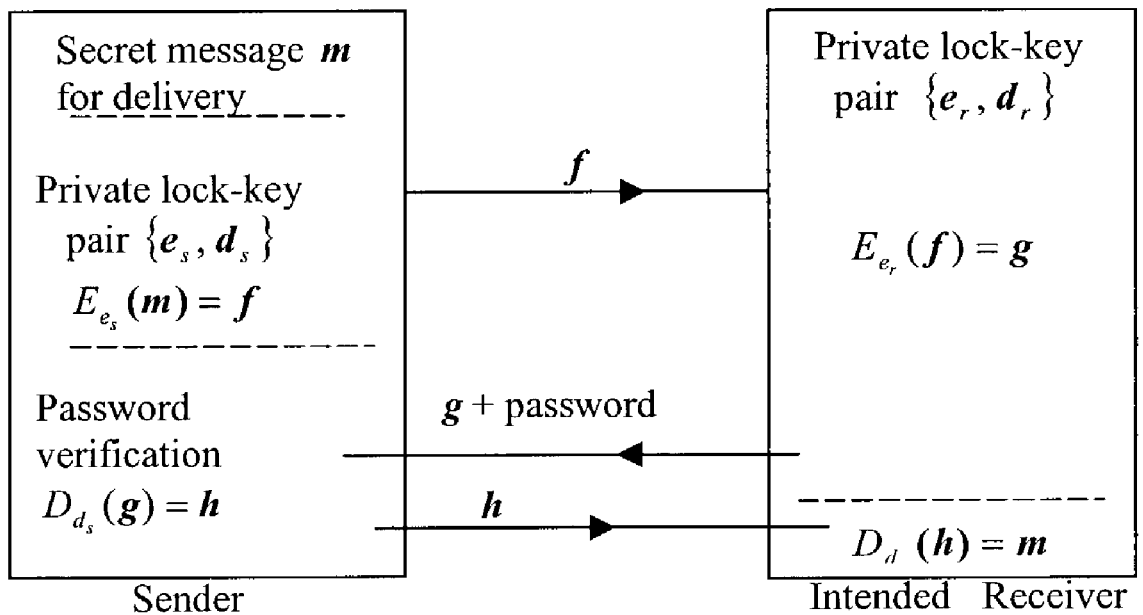
Figure 16C:
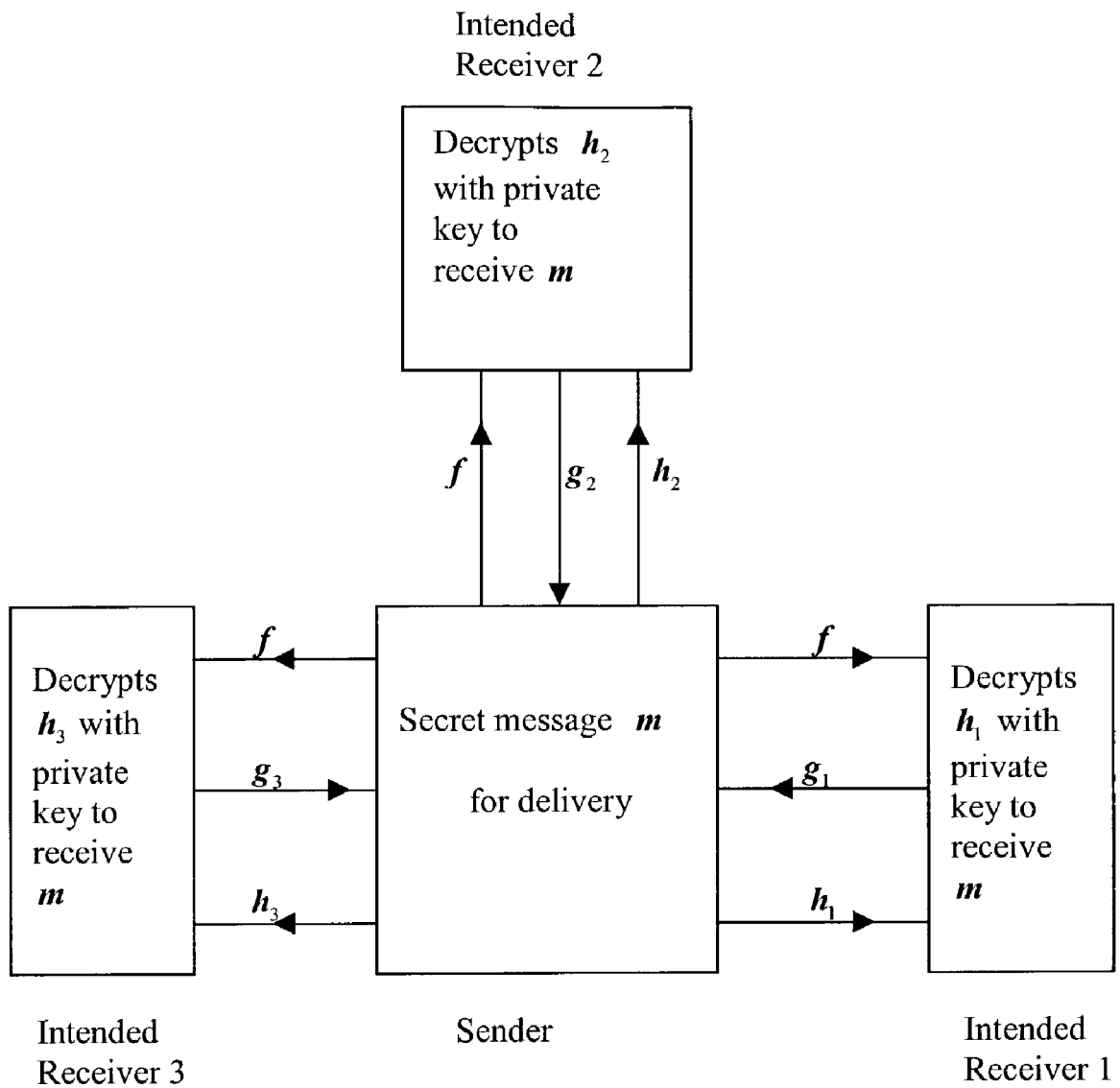
Figure 16D:
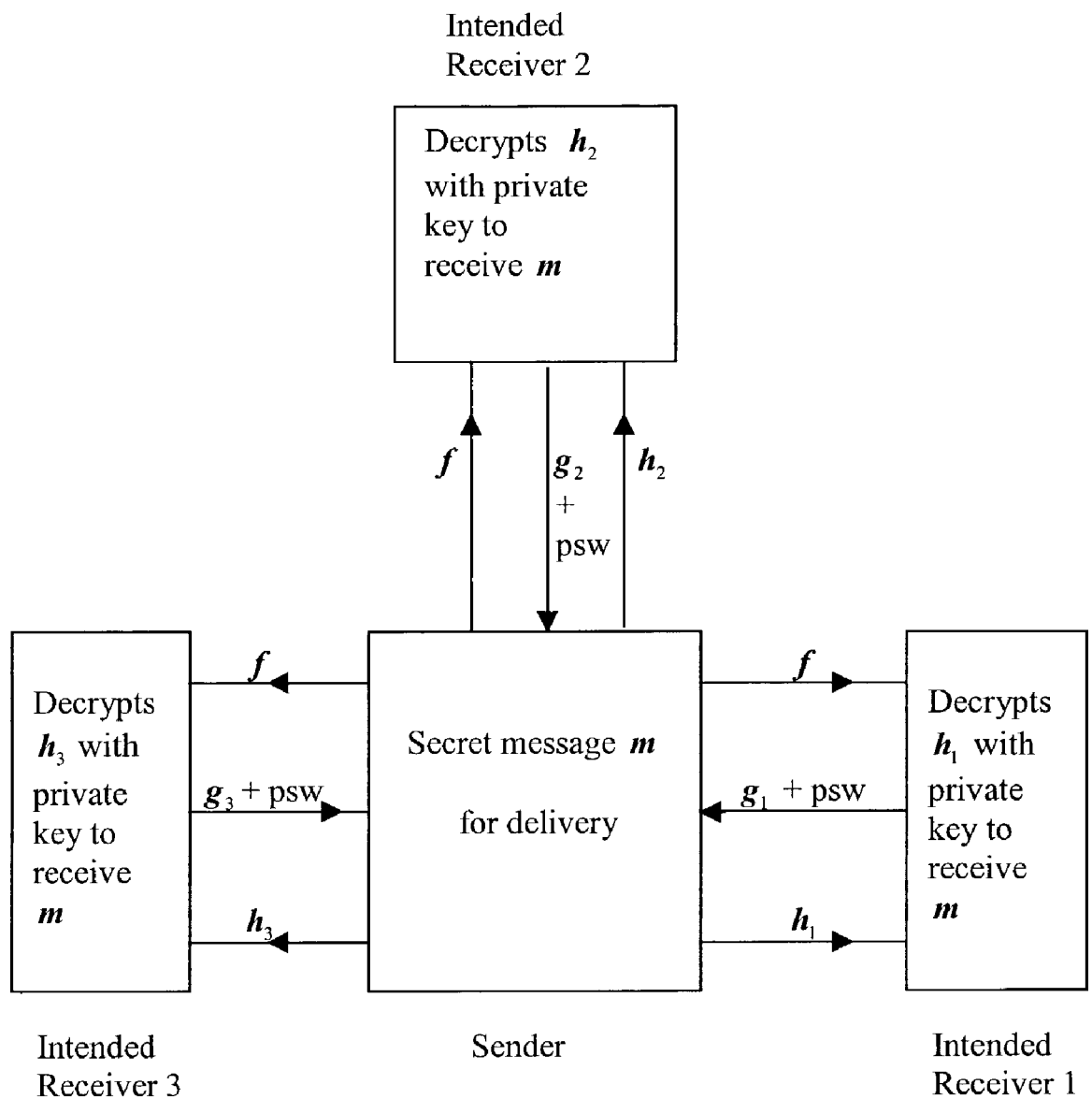
Figure 16E:
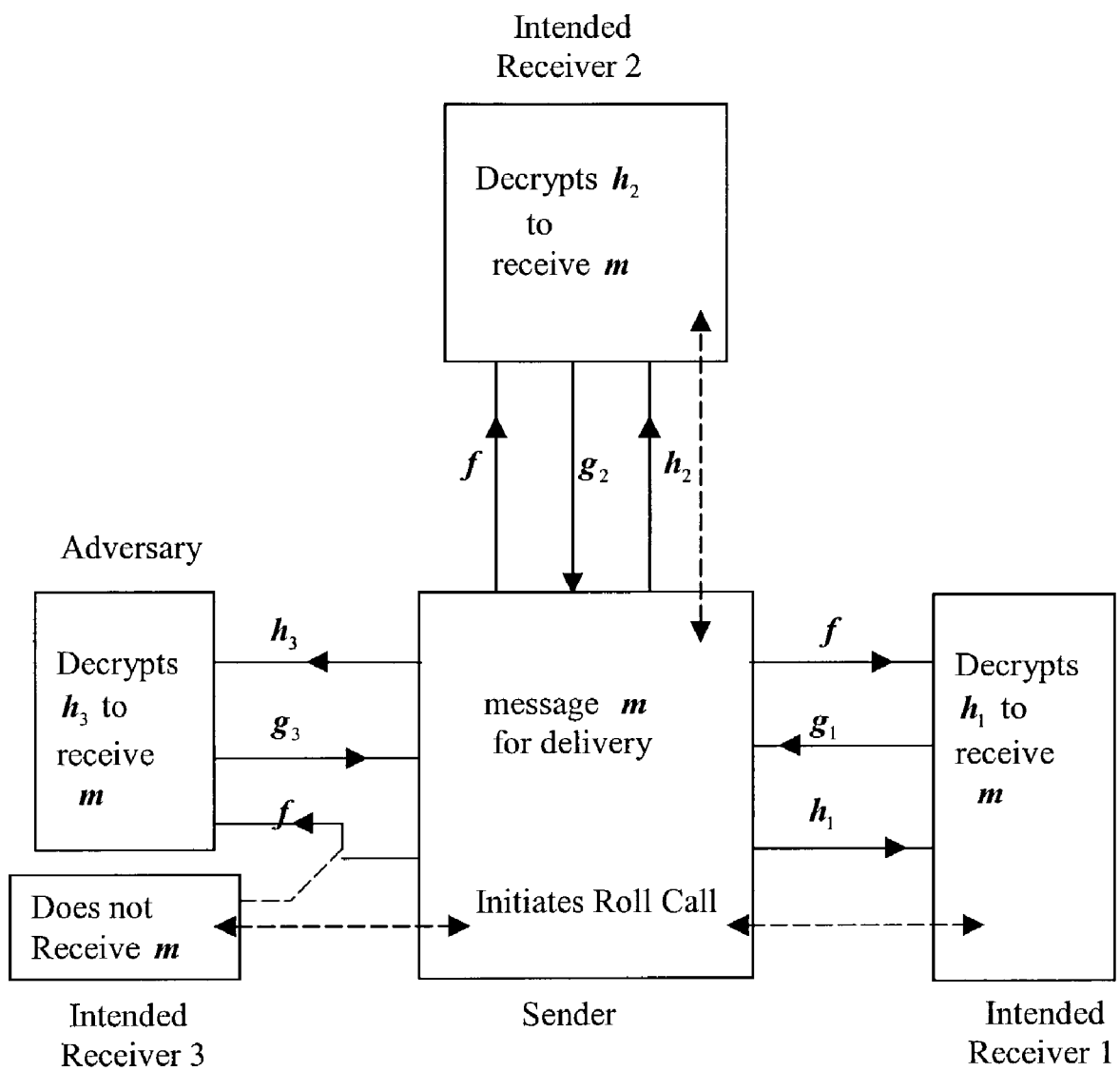

Now, in both FIG. 16A and FIG. 16B (where the password is verified), the sender unlocks the first encryption by using the decryption key $d_s$ to decrypt the message g. The sender then sends the resulting singly locked message h to the receiver, who can now safely recover the message m by unlocking (i.e., decrypting) the message h using the decryption key $d_r$. This secure key exchange methodology requires the property of commutation between the sender's key $d_s$ and receiver's lock (encryption key) $e_r$. In U.S. patent application Ser. No. 10/154,795, the method used to construct key pairs $(e_s, d_s)$ and $(e_r, d_r)$, using different arbitrary and random numbers, guarantees the commutation property between the sender's decryption (unlocking) key $d_s$ and the receivers encryption (locking) key $e_r$. In FIG. 16C, FIG. 16D, and FIG. 16E, this double-lock method and system is used to securely deliver a message m to multiple receivers. In the system of FIG. 16D, additional security is provided by requiring the receiver to send a password that is then verified by the sender before the sender unlocks the doubly-locked message g to produce the singly locked message h. In the system of FIG. 16E additional security is provided by performing a roll call, initiated by the sender to ensure that its messages are not being intercepted by an adversary. More specifically, after sending the secret message (e.g., after sending the messages f and h) the sender determines whether the intended receiver has received the secret message m, either by talking to the receivers or by using a separate secure mechanism to determine whether the intended receiving device has received the secret message m.

Figure 17A:
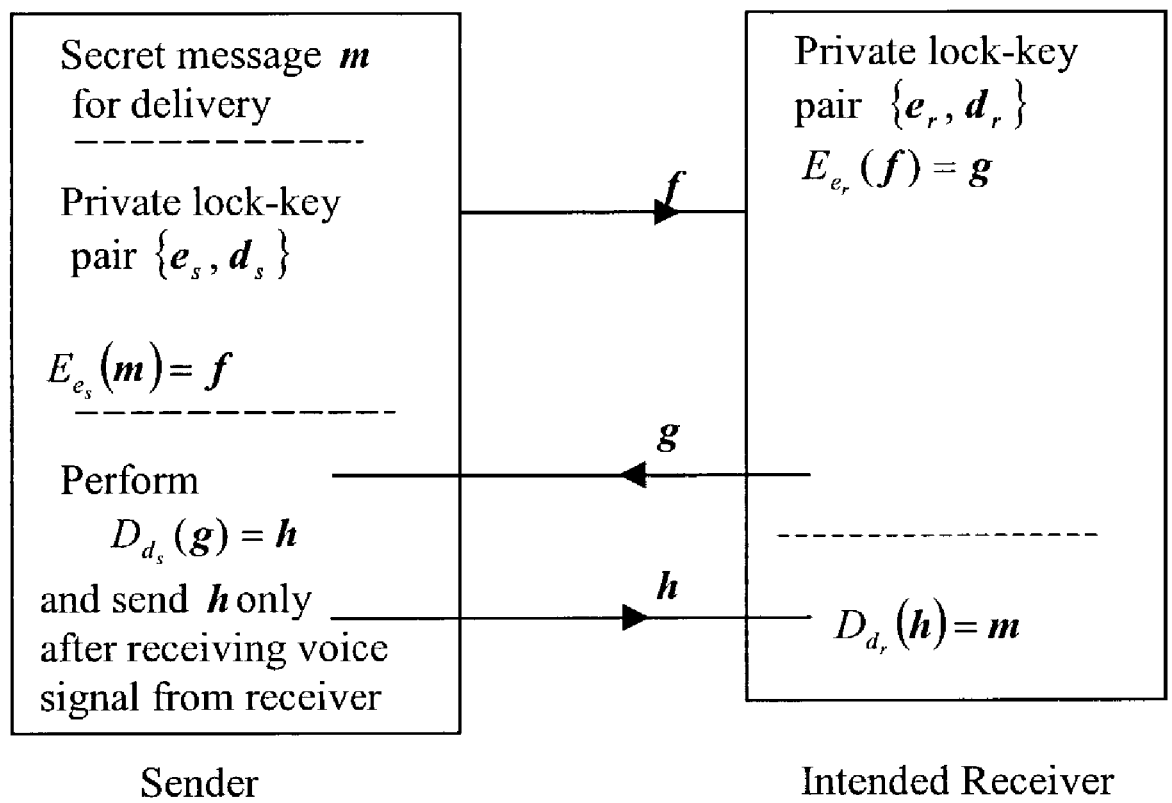
FIG. 17A shows an application of the double-lock method using voice signal activation before the sender device unlocks the first lock and sends to the intended receiver.
Figure 17B:
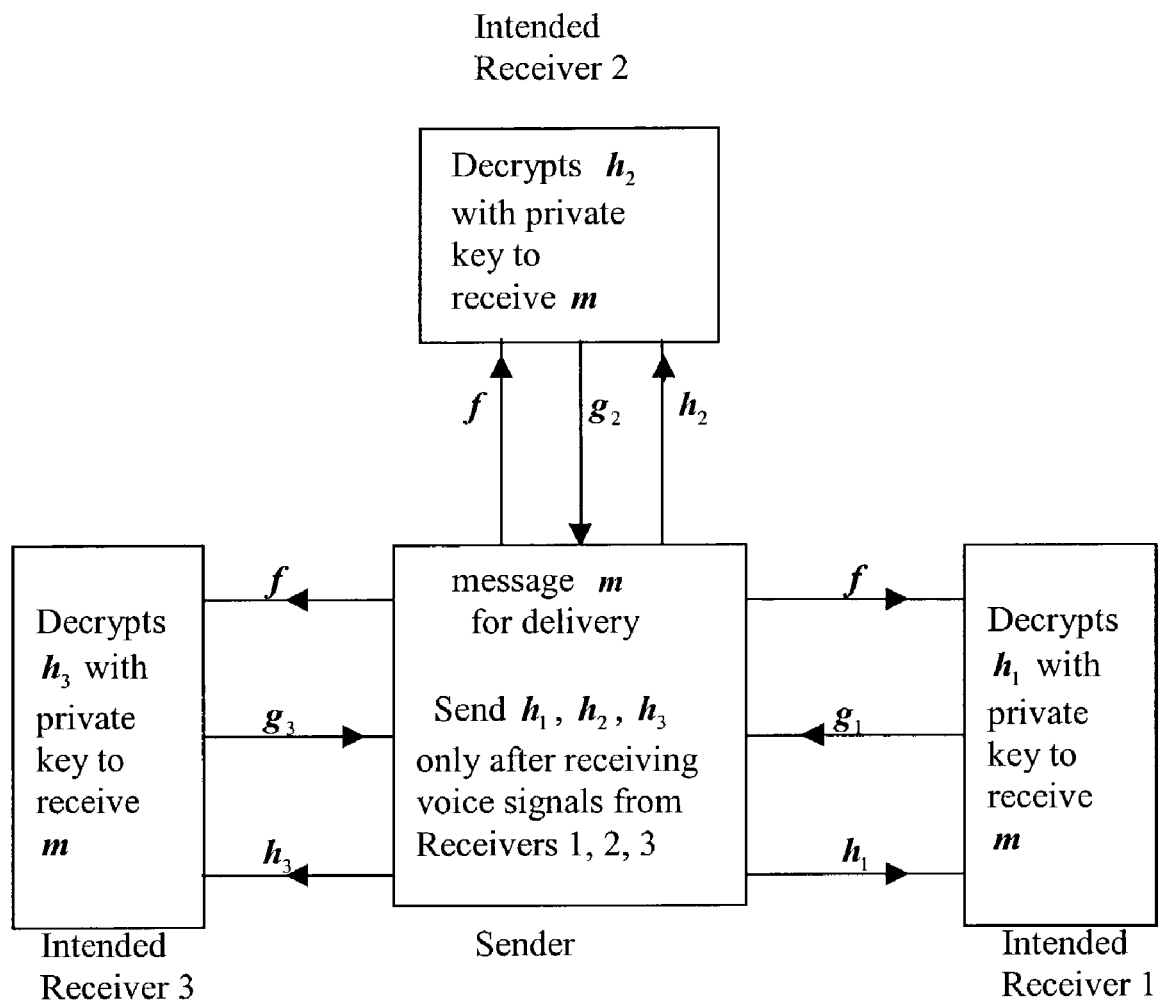
FIG. 17B shows an application of the voice activated feature of FIG. 17A with multiple intended receivers.

The present invention provides secure real-time communication, and an important application of the present invention is cellular phone communications, as well as communications between "land line" telephones or between "land line" telephones and cellular telephone. For this application, an additional feature, not disclosed in the previous U.S. patent application Ser. No. 10/154,795, is introduced here. This new feature is shown in FIG. 17A for two-party phone conversation, and FIG. 17B for multi-party conference calls, both initiated by the sender. In particular, sender's device, such as a cellular phone, is configured to ensure that the intended receiver is the one to receive the message m. The sender's device does this by not enabling the decryption of the doubly-locked message g with sender's decryption key $d_s$ (or alternately, not enabling the transmission of partially decrypted message h) until that operation is activated by a voice signal from the receiver. As a result, a "silent intruder" cannot replace an intended receiver. In one embodiment, a spectrum analysis is performed on the received voice signal to ensure that it has the spectral characteristics of a human voice before enabling the decryption of the message g or the transmission of the partially decrypted message h.

Figure 18A:
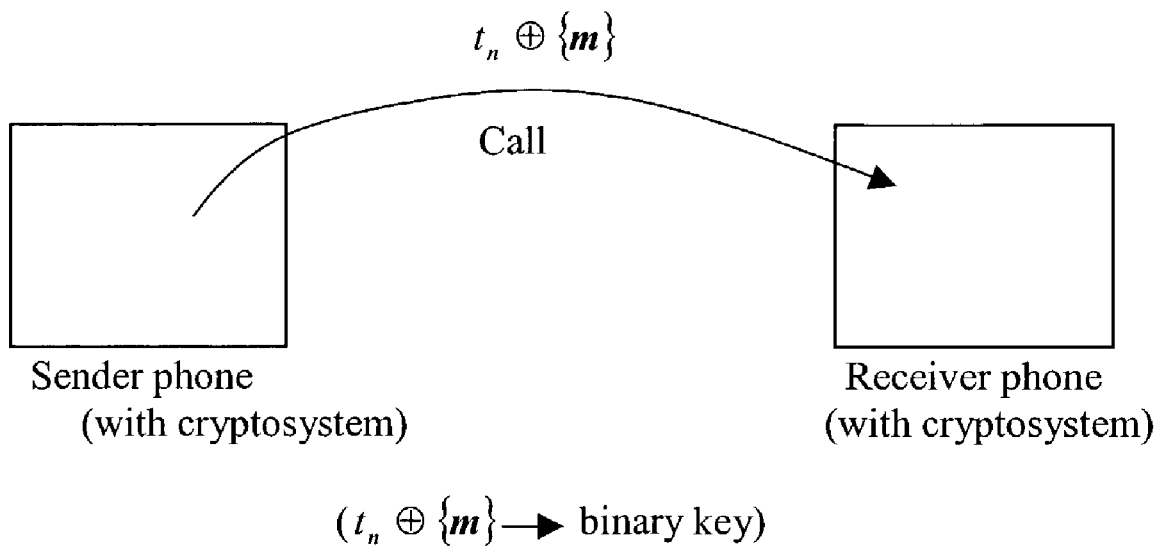
FIG. 18A shows how a secret message m is sent along with a value $t_n$ automatically when both sender and receiver devices are equipped with the cryptosystem.
Figure 18B:
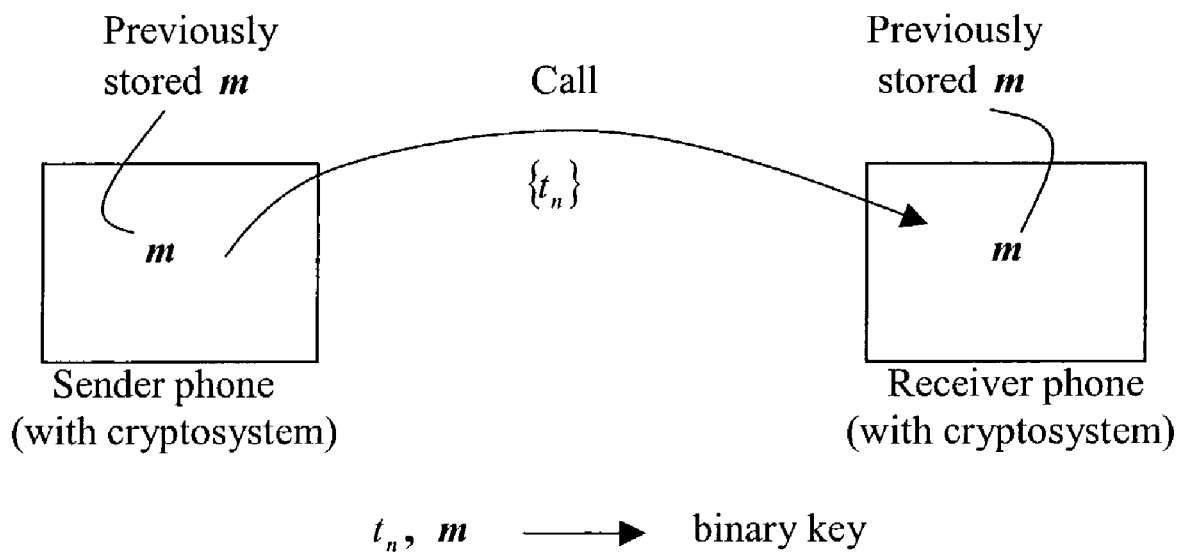
FIG. 18B shows an embodiment in which a secret message m has been previously agreed upon between the sender and receiver and stored in both devices, and in which the value $t_n$ is sent to the receiver, and is used by both sender and receiver, together with m, to create the binary session key.
Figure 18C:
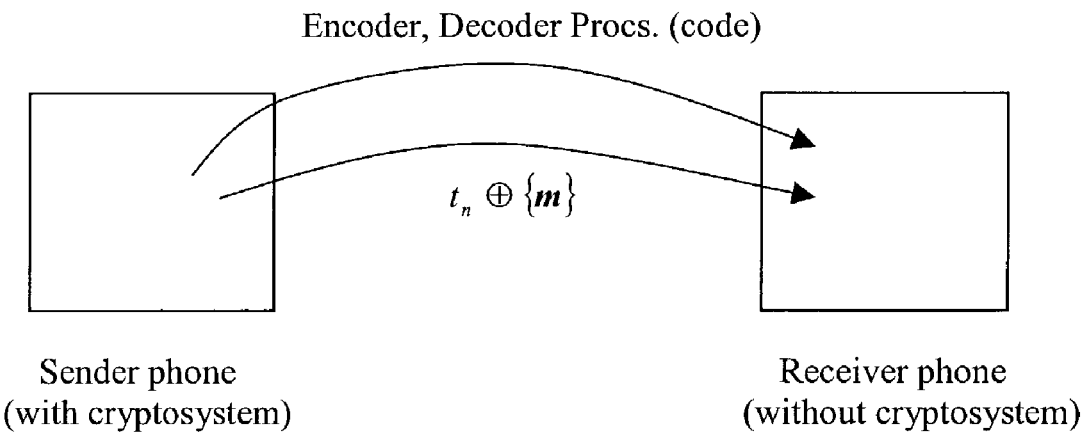
FIG. 18C illustrates how a secret message m, value $t_n$ and one or more applets are delivered from a sender device equipped with the cryptosystem to a receiver device that is not equipped with the cryptosystem.

For secure voice communication between telephones (including regular telephones and cellular telephones), teleconference stations, personal digital assistants (PDA's) or other devices, FIG. 18A shows a method and system for sending the secret numerical message m along with other numerical values $t_n$, including the receiver's phone number, and time and date of the call. The message m is used for generating the encryption and decryption key sets e and d as described previously. Message m and numerical values $t_n$ are also used to generate a symmetric binary key, to be used as the session key to carry out secure real-time (i.e. "latency-free") conversations, as explained in more detail below. For instance, the symmetric binary key may be used for encryption of the transformed coefficients to be described below with reference to FIGS. 20–27. For frequently called numbers, the secret numerical message m can be stored in advance in both receiver and sender phones. This is shown in FIG. 18B. In both FIG. 18A and FIG. 18B, both the sender and receiver telephones (or other devices, such as facsimile machines) are equipped with a cryptosystem in accordance with the present invention. Referring to FIG. 18C, for receivers that are advanced cellular phones (3G, 4G, etc.) and other communication devices that are capable of executing platform independent programs, such as JAVA (a trademark of Sun Microsystems) programs, the secret message m is transmitted by the sender along with executable transform-encryption and transform-decryption procedures (i.e., computer programs). The receiving device executes the received procedures in order to perform the transform, encryption and decryption operations needed to exchange data or messages with the sending device.

Generation of Symmetric Binary Keys

The output coefficients of the transform-encryption system are to be encrypted by applying a symmetric binary key, called a session key. A preferred method for generating such a key is described below. However, it should be clear to those familiar with the art that the following description is only illustrative of one embodiment of this aspect of the present invention. Many other methods of generating symmetric binary keys could be used in conjunction with other aspects of the present invention.

Figure 19A:
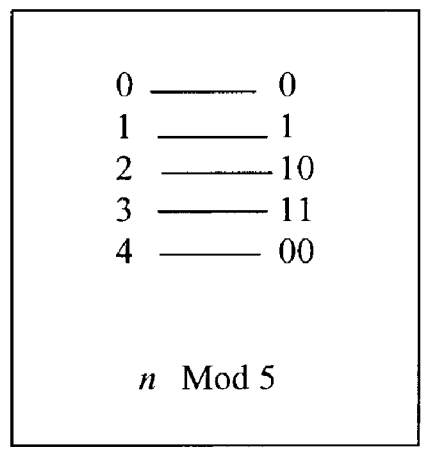
FIG. 19A illustrates an example of a table for translating a sequence of numbers (from $t_n$ or $t_n m$) into a sequence of 0 and 1 bits.

A table for converting all non-negative integers 0, 1, 2, ... to binary numbers is shown in FIG. 19A. This is not a table for binary representation, but only for representation of numbers m=n (mod 5), where $0 \leq n \leq 4$. The conversion represented by this table keeps an equal balance of the numbers of 0's and 1's in the binary keys. As a precaution, the secret numerical message m preferably includes at least one of the two numbers 2 and 7. If a message m does not have either of these two numbers, the message m may be converted into a binary sequence of all 1's or all 0's. For example, the message (1 6 8 6 8) produces a string of 7 1's and no 0's.

Figure 19B:
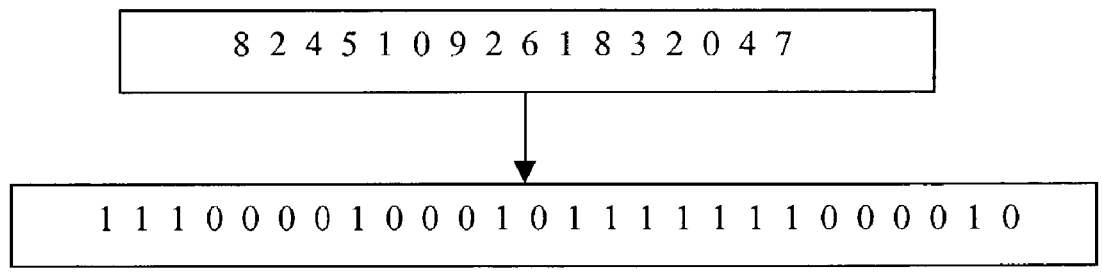
FIG. 19B illustrates an example of a sequence of 0 and 1 bits obtained by using the translation table in FIG. 19A.
Figure 20:
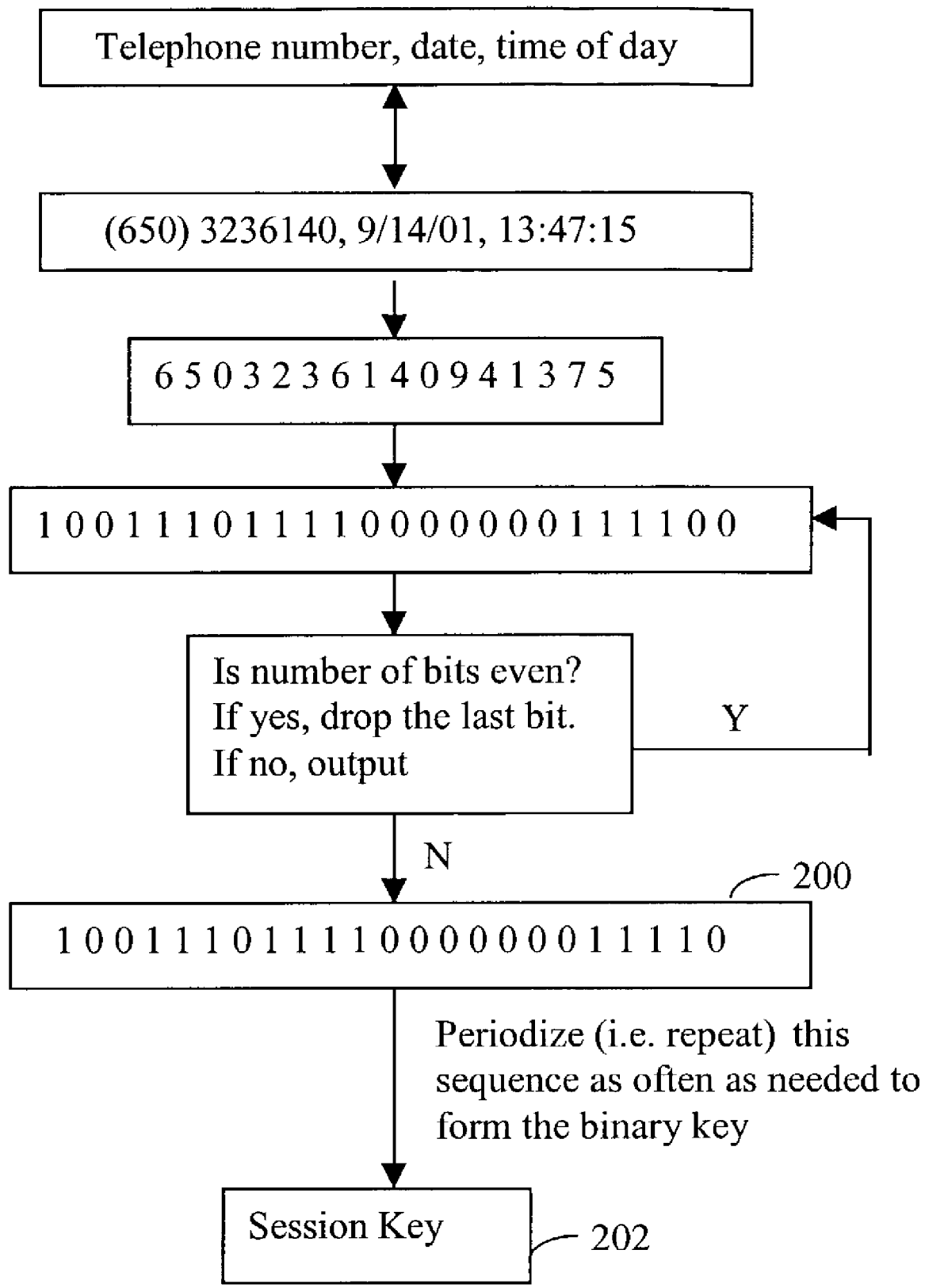
FIG. 20 is a block diagram for generating a periodic binary key with an odd number of bits, using $t_n$ and the translation table of FIG. 19A.

FIG. 19B illustrates an example of translating a numerical sequence to a binary sequence by using the conversion represented by the table in FIG. 19A. In FIG. 20, the sequence tn (in FIG. 18B, for example) is translated to a number sequence, which, in turn, is translated to a sequence of 0 and 1 bits. This sequence is truncated by one bit, if necessary, to produce a sequence 200 having a length that is an odd number. The sequence is then periodized, by repeating the sequence as often as needed to produce a session key 202. The reason for the need of an odd number of bits is that the periodic sequence (within the session key 202) must not often yield an identical block (of bits) for consecutive blocks of the same even length, such as length=32, in the preferred embodiment as shown in the registers in FIG. 11 and FIG. 12.

Figure 21:
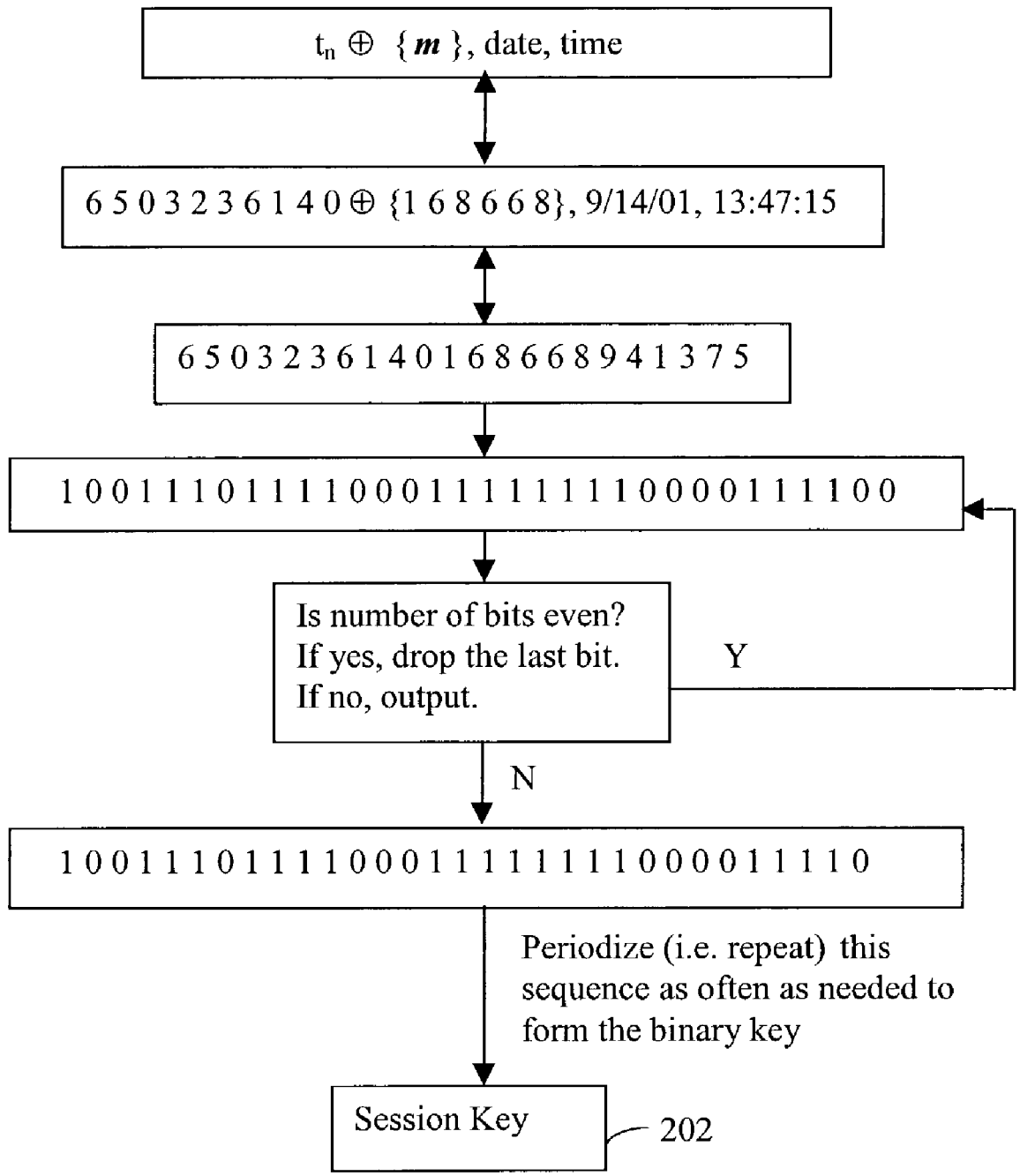
FIG. 21 illustrates the use of the secret message m in generating a periodic binary key.

In FIG. 21, the secret numerical message m is embedded in the number sequence $t_n$. To demonstrate the extreme case, a string of seven 1's (without any 0's) is produced by m=(1 6 8 6 8) in this example. Also, observe that the last bit is dropped to give an odd number of bits for periodization.

Encryption of Transformed Coefficients

Referring again to FIG. 11, we next consider how the transform coefficients output by the systems of FIG. 1A, FIG. 2A, and FIG. 11 are encrypted. In practice, this sequence of transform coefficients is encoded, and each output sequence block (as a block in the register 150, FIG. 11) is considered a code-sentence, with the code of each transformed coefficient as a codeword. However, for convenience in discussion, the codewords are still called transformed coefficients (or wavelet coefficients). It must again be emphasized, however, that the following description is illustrative of just one of many possible embodiments of the present invention. In addition, other symmetric-key encryption schemes can be used in place of the symmetric-key methodology used in the embodiment discussed next.

Figure 22:
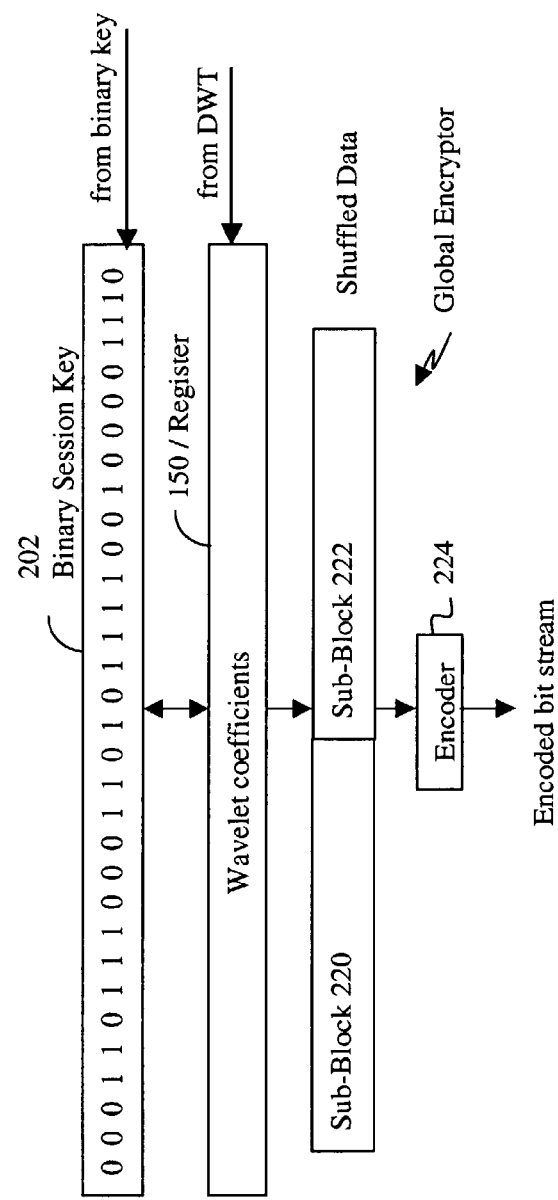
FIG. 22 shows a one-level binary key encryption of a set of transform coefficients, where the 0 and 1 values in the key specify a data shuffling pattern.

Referring to FIG. 22, we first discuss a basic one-level encryption scheme using a "global encryptor," which is used to encrypt the block of 32 (wavelet) coefficients $g_{l,0}, u_{l,0}, v_{l,0}, v_{1,0}, w_{l,0}, w_{l,1}, w_{l,2}, w_{l,3}, x_{l,0}, x_{l,1}, x_{l,2}, x_{l,3},$
$x_{l,4}, x_{l,5}, x_{l,6}, x_{l,7}, y_{l,0}, y_{i,1}, y_{l,2}, y_{l,3}, y_{l,4}, y_{l,5}, y_{l,6}, y_{l,7},$
$y_{l,8}, y_{l,9}, y_{i,10}, y_{i,11}, y_{i,12}, y_{i,13}, y_{l,14}, y_{l,15}$ output to register 150 by the transform-encryption system shown in FIG. 11. The global encryptor of FIG. 22 uses a 32-bit segment (block) of a binary key (e.g., a binary key constructed using the techniques described above, or using other techniques to produce a balanced, non-repeating binary key) to determine how to shuffle the 32 coefficients and assign them into two sub-blocks. The binary key defines a data shuffling pattern. The value in the $j^{th}$ position of the key indicates whether the $j^{th}$ coefficient (from register 150) is placed in a first sub-block 220 or second sub-block 222, with the coefficients being processed in a predefined order, such as left to right. In one embodiment, a 0 value in the $j^{th}$ position of the key places the $j^{th}$ coefficient in the second sub-block 220, and 1 value places the coefficient in the first sub-block 220. Hence, in the example shown in FIG. 22, the first and second sub-blocks contain, respectively:

(1) $v_{l,1}w_{l,0}w_{l,2}w_{i,3}x_{i,0}x_{l,4}x_{i,5}x_{i,7}y_{i,1}y_{i,2}y_{i,3}y_{l,4}y_{l,7}y_{l,12}y_{i,13}y_{i,14}$, and (2) $g_{l,0}u_{l,0}v_{l,0}w_{l,1}x_{i,1}x_{l,2}x_{l,3}x_{i,6}y_{i,0}y_{i,5}y_{i,6}y_{l,8}y_{l,9}y_{l,10}y_{l,11}y_{l,15}$.

Here and below, the index i indicates the $i^{th}$ 32-block of (wavelet) coefficients from the register 150 in FIG. 11.

Again, referring to the block of 32 (wavelet) coefficients in the register 150 in FIG. 11, but using a binary key value of 1 0 0 1 0 1 1 1 0 1 0 0 0 0 1 1 0 1 0 1 1 1 1 0 0 1 0 1 1 0 1 0 instead of the one shown in FIG. 22, the same procedure of matching 0's and 1's divides the block of 32 coefficients into two sub-blocks, with the first and second sub-blocks given by (3) $g_{i,0}v_{i,1}w_{i,1}w_{i,2}w_{l,3}x_{l,1}x_{l,6}x_{l,7}y_{l,1}y_{l,3}y_{l,4}y_{i,5}y_{i,6}y_{i,9}y_{i,11}y_{l,12}y_{i,14}$, and (4) $u_{i,0}v_{i,0}w_{i,0}x_{i,0}x_{l,2}x_{i,3}x_{l,4}x_{l,5}y_{l,0}y_{l,2}y_{l,7}y_{i,8}y_{i,10}y_{i,13}y_{l,15}$, respectively. Notice that the DC term $g_{i,0}$ is placed at the beginning, even after shuffling. Having the DC term at the beginning of each block (i.e., at a repeating position in the data stream) is not good if the DC term ($g_{i,0}$) is not encrypted, since it is easier to detect DC coefficients than other coefficients. Thus, if the encryption in the transform-encryption system in FIG. 2A or FIG. 11 is not applied to the DC term and possibly some of the other transformed coefficients (e.g., to reduce the computational overhead imposed by the encryption steps), it is advisable to interchange the two sub-blocks (3) and (4), which is equivalent to interchanging the 0 and 1 bits in the 32-bit segment of the binary key in FIG. 22.

Figure 23:
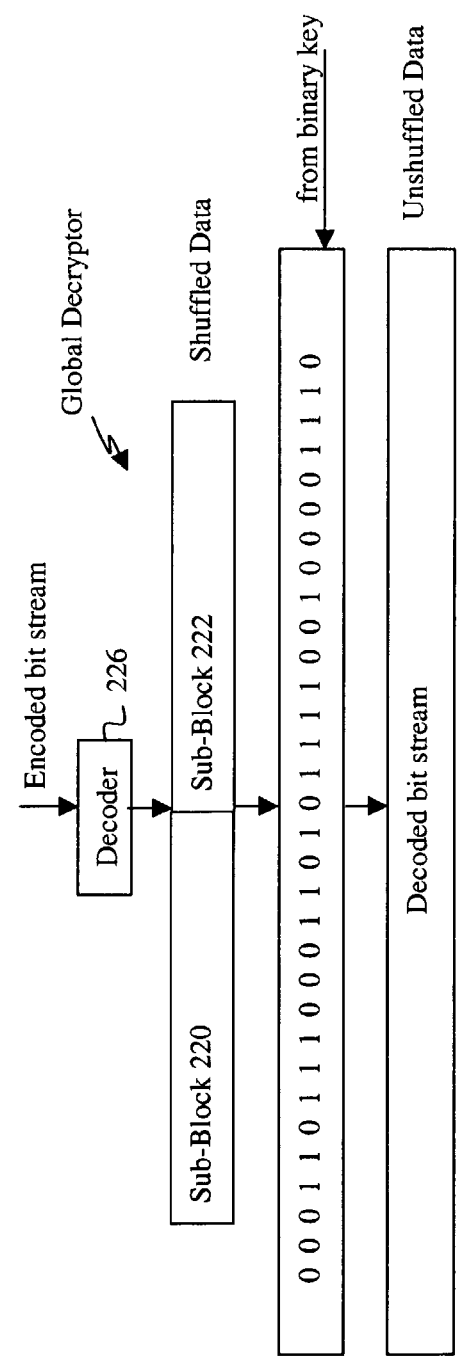
FIG. 23 shows the inverse of the operation shown in FIG. 22.

Decryption of the shuffled wavelet coefficients is easily accomplished by un-shuffling the shuffled data, i.e., by reversing the order of matching with the 0 and 1 bits, as shown in FIG. 23.

In some embodiments, the shuffled data produced by the global encryptor is further encrypted by an encryptor 224, for instance using an additional symmetric key encryption. In such embodiments, the global decryptor (FIG. 23) includes a corresponding decryptor 226 is used in the receiving device to reverse the encryption operation by encryptor 224.

Referring to FIGS. 24 and 25, to increase security, a binary key segment is used as the "root" or "ground level" to build a binary tree with two branches for the first level. For purposes of illustration, FIGS. 24 and 25 show a 12-bit key segment, whereas a 32-bit key segment is used in a preferred embodiment. In the first level, one branch (e.g., the right branch) has a sub-block with length given by the number of 0 bits in the key segment, and the other branch (e.g., the left branch) has a sub-block with a length given by the number of 1 bits in the key segment. To generate the second level of the binary tree, each of the two branches of level 1 is treated as the ground level to build two sub-branches, by following the same scheme. This is done repeatedly until every branch consists only of either all 1's or all 0's. In the example shown in FIG. 24, there are three levels above the ground level; and the example in FIG. 26 consists of five levels above the ground level. Here, for keeping track of the encrypted coefficients, the last (i.e. fifth) level is completed to have the same length as the ground level by repeating the all entries that ended at higher levels of the binary tree. This last step is not necessary, but is convenient for bookkeeping.

To encrypt the wavelet coefficients, the same procedure of bit matching for the ground level is repeated for each higher level. For simplicity, only a 12-bit key segment is illustrated in FIG. 24–FIG. 25. The coefficients $x_1, \ldots, x_{12}$ that match with 0 are put in the second branch and those that match with 1 are put in the first branch. Now, the coefficients $x_3$ $x_4$ $x_6$ $x_9$ $x_{10}$ in the first branch of Level 1 are placed on two sub-branches with $x_6$ $x_9$ that match with 1 placed on the first sub-branch Level 2 and $x_3$ $x_4$ $x_{10}$ that match with the second sub-branch of this particular branch. The same procedure applies to the coefficients on the second branch on Level 1. This completes encryption up to Level 2.

In this particular example, this also completes the encryption process by using the full binary tree, since all of the branches in Level 2 either (A) have all 0's or all 1's, or (B) contain only a string of 1's followed by a string of 0's, so that Level 3 does not shuffle any of the coefficients.

On the other hand, all five of the levels in FIG. 26 contribute to the encryption. For example, even the fifth level interchanges $x_6$ and $x_{10}$ to arrive at the final encrypted result as shown on the fifth level in FIG. 27.

In one embodiment, full binary trees are used for encrypting the wavelet coefficients.

In another embodiment, a fixed number of levels (e.g., three levels) are used for every 32-bit binary key segment.

In another embodiment, a variable number of encryption levels for different 32-bit binary key segments are used. For instance, the length of the first block of 0 bits in the 32-bit binary key segment (i.e., the ground level of the tree), which is equally available to the sending and receiving devices, may be used to indicate the number of encryption levels.

In yet another embodiment, instead of matching the coefficients with the bits of the binary key segment, the match is performed bit by bit in matching the 0 and 1 bits of the coded bitstream of the wavelet coefficients with the binary key, changing 1 to 0 or 0 to 1 of the bitstream when it matches a 1 bit of the binary key. Alternately, the bits of the wavelet coefficients may be reordered in accordance with the bits of the binary key, using the technique described above with respect to FIGS. 24–27, but reordering bits of the wavelet coefficients in accordance with the binary key instead of reordering entire coefficient values.

Sending & Receiving Device

Figure 28:
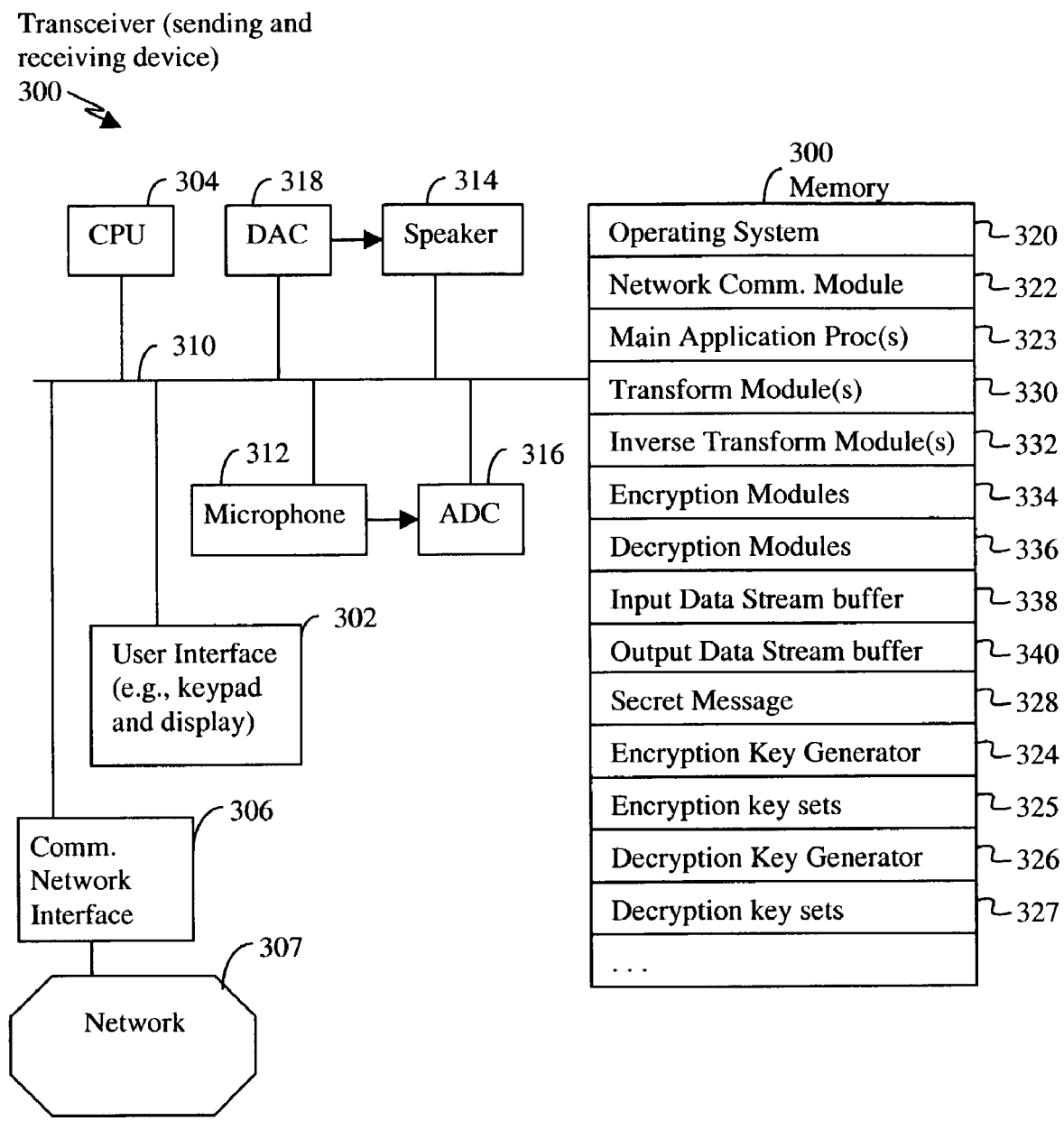
FIG. 28 is a block diagram of a transceiver incorporating transform and encryption features of the present invention.

In a preferred embodiment, each sending and receiving device is implemented as a transceiver 300, as schematically shown in FIG. 28. For instance, the transceiver 300 may be a mobile telephone. Alternately, the transceiver 300 may be a facsimile machine, a teleconferencing station, a computer having telephone and/or facsimile capabilities, or the like. The transceiver 300 will typically have a user interface 302, one or more processing units (CPU's) 304 for executing stored programs, a network or other communications interface 306, memory 308, and one or more communication busses 310 for interconnecting these components. When the transceiver 300 is used for voice communications, it will typically also include a microphone 312 and speaker 314 for receiving and outputting audio signals, respectively. An analog to digital converter (ADC) 316 converts the audio frequency signals output by the microphone 312 into a stream of digital data. In addition, a digital to analog converter (DAC) 318 converts a stream of digital data produced by the one or more CPU's 304 into an analog audio frequency signal that is converted by the speaker 314 into an audible audio signal.

Memory 308 may include high-speed random access memory and may include non-volatile memory, such as one or more magnetic disk storage devices. In some implementations, the memory 308 may include mass storage that is remotely located from the central processing unit(s) 304. The memory 308 preferably stores:

an operating system 320 that includes procedures for handling various basic system services and for performing hardware dependent tasks;

a network communication module 322 that is used for connecting the transceiver 300 to other devices via one or more communication networks 307, such as the public telephone network, wireless telephone networks, the Internet, other wide area networks, local area networks, metropolitan area networks, and so on;

a main application program 323, or a set of such procedures, for controlling the operation of the device 300 (e.g., controlling mode of operation of the device, controlling data flows between memory buffers 336, 338 and the ADC 316 and DAC 318 devices, etc.);

an encryption key generator 324 and a decryption key generator 326 for generating encryption key sets 325 and decryption key sets 327 from a secret message 328;

one or more transform modules 330 for applying a wavelet or wavelet-like transform, or other suitable transform, to a stream of input data (e.g., the data in input data stream buffer 340 ); the transform module(s) 330 are used when the device 300 is being used as a sending device;

one or more inverse transform modules 332 for applying an inverse wavelet or wavelet-like transform, or other suitable inverse transform, to a stream of input data (e.g., the data in input data stream buffer 340 ); the inverse transform module(s) 332 are used when the device 300 is being used as a receiving device;

one or more encryption modules 334 for encrypting data, such as intermediate transform coefficients, or a subset of those transform coefficients, such as in the transform-encryption system of FIG. 2A or FIG. 11, and/or for encrypting the output data produced by the transform modules 330 (i.e., the encryption modules 334 include a module for the global encryptor of FIG. 22);

one or more decryption modules 336 for decrypting data, such as transform coefficients, or a subset of those transform coefficients, such as in the inverse transform-decryption system of FIG. 2B or FIG. 12, and/or for decrypting the data received by the transform modules 330 (i.e., the decryption modules 336 include a module for the global decryptor of FIG. 23); and data buffers 338, 340, including an input data stream buffer 338 and an output data stream buffer 340.

ALTERNATE EMBODIMENTS

Although the preferred embodiments use wavelet transforms or wavelet-like transforms, DWT, in a transform-encryption system, the popular transform DCT (discrete cosine transform) can be used in alternate embodiment, though with a certain degree of latency. More generally, in alternate embodiments, DWT can be replaced in an appropriate way by any other transform such as discrete cosine transform (DCT), discrete sine transform, Hadamard transform, FFT, or a cascade of such transforms.

For example, consider a register with 16 slots and apply a 4-term DCT (i.e., a 4-term DCT with 1 DC output and 3 AC output transformed data) to an incoming signal data sequence. The four DC terms, with one from each 4-DCT output are encrypted, and another 4-DCT is applied to these encrypted values. These are put in the first block of the register, occupying 4 slots. The other 12 slots are divided into 4 blocks, with 3 slots for each block. The 3 AC terms from each of the four 4-DCT outputs are put in one of these four blocks in the register. The ordering is according to the ordering of partitioning of the incoming signal data sequence. Various modifications of this technique could be used in other embodiments that employ the DCT instead of the DWT.

In another embodiment, other key exchange methods can be used for sending the secret message, unless the secret message has been agreed upon between the sender and receiver in advance.

In another embodiment, any symmetric key generating scheme can be used, and other efficient algorithms can be applied to encrypt/decrypt the (encoded) decomposed coefficients in $H_2, \ldots, H_n, L_n$.

Also, although telephone communication (and particularly cellular phone communication) is used as an example for the application of the invention, the present invention is also applicable to video conferencing and other applications that benefit from real-time, low-latency, secure communications.

While several embodiments have been described above, these embodiments are illustrative of the invention and are not to be construed as limiting the invention. Various modifications may occur without departing from the true spirit and scope of the invention as defined by the appended claims.

What is claimed is:

1. A method of encoding a stream of data, comprising:
   applying a multilevel transform to the stream of data, each level of the transform producing one or more transform coefficients for each block of a sequence of blocks comprising the stream of data; and
   encrypting at least a subset of the transform coefficients produced by a least one level of the multilevel transform to generate encrypted transform coefficients;
   the applying including applying at least one level of the multilevel transform to the encrypted transform coefficients to produce other transform coefficients;
   the applying and encrypting generating a result set of transform coefficients.

2. The method of claim 1, wherein the encrypting includes encrypting using a symmetric key encryption.

3. The method of claim 1, wherein the encrypting is performed using only add, subtract and bit shift operations.

4. The method of claim 3, wherein the applying is performed using only add, subtract and bit shift operations.

5. The method of claim 1, wherein the applying is performed using only add, subtract and bit shift operations.

6. The method of claim 1, wherein the method is performed in real time, producing the output data stream at a same rate as the stream of data is presented for encoding.

7. The method of claim 6, further including
   encrypting the result set of transform coefficients, using a symmetric key encryption, to generate an output data stream; and
   transmitting the output data stream from a sending device to a receiving device.

8. The method of claim 7, wherein the encrypting of the result set of transform coefficients is performed by reordering values in the result set of transform coefficients in accordance with an encryption key.

9. The method of claim 8, wherein the encryption key is derived from a secret message known to both the sending device and receiving device.

10. The method of claim 9, wherein the secret message is conveyed from the sending device to the receiving device by locking the secret message with a first key known to the sending device to produce a locked message and transmitting the locked message to the receiving device, receiving from the receiving device a doubly locked message corresponding to the locked message, decrypting the doubly locked message with a second key corresponding to the first key to produce a singly locked message and transmitting the singly locked message to the receiving device, wherein the singly locked message can be decrypted, using a key known by the receiving device, to produce the secret message.

11. The method of claim 1, wherein the multilevel transform is selected from the set consisting of a multilevel wavelet transform and a multilevel wavelet-like transform.

12. A system for encoding a stream of data, comprising:
a transform module for applying a multilevel transform to the stream of data, each level of the transform producing one or more transform coefficients for each block of a sequence of blocks comprising the stream of data; and
one or more encryption modules configured to encrypting at least a subset of the transform coefficients produced by a least one level of the multilevel transform to generate encrypted transform coefficients;
the transform module configured to apply at least one level of the multilevel transform to the encrypted transform coefficients to produce other transform coefficients;
the transform module and encryption module configured to work together to generate a result set of transform coefficients.

13. The encoding system of claim 12, wherein the one or more encryption modules are configured to use a symmetric key encryption.

14. The encoding system of claim 12, wherein the one or more encryption modules are configured to encrypt the at least a subset of the transform coefficients using only add, subtract and bit shift operations.

15. The encoding system of claim 14, wherein the transform module is configured to apply the multilevel transform to the stream of data using only add, subtract and bit shift operations.

16. The encoding system of claim 12, wherein the transform module is configured to apply the multilevel transform to the stream of data using only add, subtract and bit shift operations.

17. The encoding system of claim 12, wherein the transform module and one or more encryption modules are configured operate in real time, producing the output data stream at a same rate as the stream of data is presented for encoding.

18. The encoding system of claim 12, further including
a transform output encryption module, coupled to the transform module and configured to encrypt the result set of transform coefficients, using a symmetric key encryption, to generate an output data stream.

19. The encoding system of claim 18, wherein the transform output encryption module is configured to encrypt the result set of transform coefficients by reordering values in the result set of transform coefficients in accordance with an encryption key.

20. The encoding system of claim 19, wherein the encryption key is derived from a secret message known to both the sending device and receiving device.

21. The encoding system of claim 20, including secret key conveying means configured to convey the secret message from the sending device to the receiving device by locking the secret message with a first key known to the sending device to produce a locked message and transmitting the locked message to the receiving device, receiving from the receiving device a doubly locked message corresponding to the locked message, decrypting the doubly locked message with a second key corresponding to the first key to produce a singly locked message and transmitting the singly locked message to the receiving device, wherein the singly locked message can be decrypted, using a key known by the receiving device, to produce the secret message.

22. The encoding system of claim 12, wherein the multilevel transform is selected from the set consisting of a multilevel wavelet transform and a multilevel wavelet-like transform.

* * * * *

UNITED STATES PATENT AND TRADEMARK OFFICE
CERTIFICATE OF CORRECTION

PATENT NO. : 7,174,020 B2  Page 1 of 1
APPLICATION NO. : 10/278162
DATED : February 6, 2007
INVENTOR(S) : Charles K. Chui It is certified that error appears in the above-identified patent and that said Letters Patent is hereby corrected as shown below:

On the Title Page, under Related U.S. Application Data, insert the following:

Item -- (63)  Continuation of application 10/154,795, filed on May 23, 2002, now Pat. No. 6,898,288 --.

Signed and Sealed this

Second Day of September, 2008

JON W. DUDAS
*Director of the United States Patent and Trademark Office*